United States Patent [19]
Levison et al.

[11] Patent Number: 5,465,303
[45] Date of Patent: Nov. 7, 1995

[54] AUTOMATED FINGERPRINT CLASSIFICATION/IDENTIFICATION SYSTEM AND METHOD

[75] Inventors: Laurence L. Levison, McLean, Va.; Paul B. Goldberg, Longwood; Scott D. Stanek, Orlando, both of Fla.

[73] Assignee: Aeroflex Systems Corporation, Plainview, N.Y.

[21] Appl. No.: 151,020

[22] Filed: Nov. 12, 1993

[51] Int. Cl.$^6$ .................................................. G06K 9/00
[52] U.S. Cl. ......................................... 382/124; 382/125
[58] Field of Search ............................. 382/4, 5, 37, 36, 382/38; 283/7, 68, 69, 78; 356/71

[56] References Cited

U.S. PATENT DOCUMENTS

| | | | |
|---|---|---|---|
| 4,229,023 | 10/1980 | Luz | 283/7 |
| 4,752,966 | 6/1988 | Schiller | 382/4 |
| 4,947,442 | 8/1990 | Tanaka | 382/5 |
| 5,020,112 | 5/1991 | Chou | 382/37 |
| 5,040,223 | 8/1991 | Kamiya et al. | 382/4 |
| 5,337,369 | 8/1994 | Shibuya | 382/5 |

OTHER PUBLICATIONS

U.S. Congress, Office of Technology Assessment, *The FBI Fingerprint Identification Automation Program: Issues and Options–Background Paper*, OTA–BP–TCT–84 (Washington, D.C.: U.S. Govt. Printing Office, Nov. 91, pp. 1–39).

Thomas F. Wilson et al., *Automated Fingerprint Identification Systems: Technology and Policy Issues*, NCJ–104342, Apr. 1987, pp. 2–20.

R. McCabe et al., *Research Considerations Regarding FBI–IAFIS Tasks & Requirements*, Aug. 1992, pp. 1–18.

Rossett et al., *ABC del Dactiloscopo*, Published by Policia Federal Argentina, Chapter 9, Sep. 1984, and summary description in English.

G. T. Candela, *Comparative Performance of Clarification Methods for Fingerprints*, NISTIR 5163, U.S. Department of Commerce, pp. 1–41 (Apr. 1993).

Chang et al., *Fingerprint Classification with Model–Based Neural Networks*, Abstract, Loral Defense Systems, Arizona (May 1993).

Andre A. Moenssen, *Fingerprint Techniques*, pp. 158–173, Funk & Wagnalls, Sep. 1963.

B. C. Bridges, *Practical Fingerprinting*, pp. 28–87, 99–112 and 156–161, Chilton, May 1971.

*Primary Examiner*—Yon J. Couso
*Attorney, Agent, or Firm*—Sterne, Kessler, Goldstein & Fox

[57] ABSTRACT

An automated fingerprint classification and identification system used to determine or verify the identity of an unknown person by comparing one or more of the person's fingerprints (i.e., the unknown fingerprints) to known fingerprints stored in a database. The components of the present invention include: (1) an apparatus and method for automatically classifying and storing the fingerprints in the database according to a lesser known manual 10-fingerprint classification method (the Vucetich classification and subclassification method), and (2) an apparatus and method for limiting the search of the database to only those fingerprints that are of the same classification as the unknown fingerprint(s). By endowing the standard automatic fingerprint identification systems with automated fingerprint classification and storage features of the present invention, the present invention reduces the amount of time required for an automated fingerprint identification system's "matcher" (the processing unit that searches the database) to complete a database search, thus increasing the speed of the system and/or reducing the number of matchers required to obtain a desired processing speed. By using the Vucetich classification method instead of other commonly used 10-fingerprint classification methods, the efficiency gain is maximized. In practical terms, the effect of the present invention is to lower the cost of the equipment required to perform automated fingerprint searches while preserving the accuracy of state-of-the-art systems.

14 Claims, 22 Drawing Sheets

[ 302 ]

[ 304 ]

[ 306 ]

[ 308 ]

502  504

1202

1204

AUTOMATED FINGERPRINT CLASSIFICATION/IDENTIFICATION SYSTEM AND METHOD

BACKGROUND OF THE INVENTION

1. Field of the Invention

The present invention relates to a computer-based automated fingerprint classification and identification system.

2. Related Art

Since the turn of the century, fingerprint identification has been the most widely accepted method for positively establishing the identity of an individual. It is used by law enforcement agencies throughout the world to determine or verify the identity of criminals. It is also being used increasingly to verify the identity of individuals who have applied for passports, drivers licenses, or other official documents and to verify that persons applying for certain types of employment or for security clearances do not have a criminal history.

Automated Fingerprint Identification Systems (AFIS) were introduced commercially in the early 1980s. Studies by law enforcement agencies have since demonstrated that such systems dramatically increase the number of fingerprint comparisons a given agency can perform per day. For example, in California, where state law enforcement agencies use one of the world's most advanced AFIS networks to perform searches on a database containing fingerprints for 7.5 million people, state officials reported productivity gains of 300 to 400 percent shortly after the automated system was implemented. (Wilson and Woodard, *Automated Fingerprint Identification Systems: Technology and Policy Issues*, U.S. Department of Justice NCJ-104342, April 1987, page 12) (incorporated herein by reference).

Studies have also shown that automated fingerprint identification systems are more accurate than manual systems. (Accuracy, as applied to fingerprint searches, refers to the ability of the human or electronic searcher to correctly locate a match for an unknown fingerprint card when a match in fact exists in the file or database.) In two national surveys performed since 1979, manual fingerprint searches were found to be, at best, 74 percent accurate; in contrast, AFIS users typically report accuracy rates of 98 percent or higher. (Wilson and Woodard, page 12)

Despite the proven benefits of AFIS technology, the vast majority of the world's law enforcement agencies continue to perform fingerprint searches manually. Furthermore, those agencies that have AFIS's are often unable to fully exploit the potential these systems provide. The reason in both cases has to do with a design characteristic common to all commercially available AFIS's. The characteristic, which involves the use of parallel processors (e.g., high powered supercomputers) to reduce the amount of time required to perform a single fingerprint comparison (thereby increasing a system's production capacity), drives up the cost of AFIS technology to a level that prevents many law enforcement agencies from automating at all and forces some that do automate to adopt cost-saving practices that reduce the benefits gained by automating.

The concept of using a classification system to limit the number of comparisons against which an unknown fingerprint must be compared to find a match is not new. Manual fingerprint classification systems have been used for more than 100 years to achieve precisely this goal. Neither is the concept of using an automated classification system new. The National Institute of Standards and Technology (U.S. Commerce Department, Technology Administration) derailed the economic advantages of combining automated classification components with existing AFIS technology in a 1992 critique of the U.S. Federal Bureau of Investigation's planned AFIS. (McCabe, et. al., *Research Considerations Regarding FBI-IAFIS Tasks and Requirements*, NISTIR 4892, August 1992) (incorporated herein by reference). The report pointed out, however, that although work on fully automated fingerprint classification systems has been underway since the mid 1980s "no viable approaches were ever fully developed." (McCabe, page 12, emphasis added).

In a more recent NIST report, the authors identified four major approaches (structural, syntactic, rulebased, and artificial neural network) that have been used as the basis for automatic fingerprint classification systems that have been reported in the literature to date (G. T. Candela, R. Chelleppa, Comparative Performance of Classification Methods for Fingerprints, NISTIR 5103, April 1993, page 5) (report incorporated herein by reference). According to the authors, all past attempts have focused on automating the Henry Classification System or newer one-tier classification systems which divide fingerprints into five or seven categories.

Conventional AFISs are described in greater detail in the following paragraphs.

A. How Automated Fingerprint Identification Systems Work

1. Comparison to Manual Systems

The automated fingerprint identification system is most easily understood by comparing it to a manual fingerprint identification system. In functional terms, the manual fingerprint system consists of these elements:

(1) A Classification System under which fingerprints are grouped according to some visually distinguishable set of features and filed by category.

(2) A Data Input System used to create the fingerprint cards. Fingerprint cards in a manual system are generally produced manually by inking the fingers and pressing the finger on a card in a prescribed location; however, commercially available inkless fingerprint scanning devices can also be used to produce cards.

(3) An Archive where fingerprint cards are filed in accordance with the classification method used by the organization.

(4) Technicians who visually examine unknown fingerprints submitted for comparison, determine the classification of each unknown fingerprint, compare the unknown fingerprint against file fingerprints in the same classification, and determine if a match exists.

Using the above-described system, the process for positively establishing identity revolves around three critical steps: (1) the creation of a fingerprint card for the unidentified person; (2) the classification of each fingerprint and of the fingerprint card itself; and (3) a comparison of the unknown person's fingerprints to all fingerprint cards that are within the same classification as the unknown card. The search is effected by comparing the minutiae points of one fingerprint on the unknown card (i.e., the points at which a ridge in the fingerprint pattern ends or at which two ridges meet) to the minutiae points for the corresponding finger on each of the fingerprint cards from the file. When a match is found, the minutiae points for one or more of the remaining fingerprints on the fingerprint cards are compared to confirm the match. Where there is an exact correlation, or an acceptably high degree of correlation, between the minutiae points of the unknown fingerprints and a set of prints from the file, the identity of the unknown person is positively established.

Because the process of manually comparing fingerprints is time-consuming and therefore expensive, most law enforcement agencies actually begin the fingerprint comparison process with a "name search", meaning the technician first checks the name on a known fingerprint card against a master index containing the names and other identity data from all of the fingerprint cards in the file. If the technician finds a name match, he/she compares the incoming card to the fingerprint card on file under the same name. If statistical information from the State of California holds true in other jurisdictions, approximately 47 percent of all criminal fingerprint checks are completed on the basis of a name search alone. (Wilson and Woodard, p. 3) When no match is found through a name search, the technician classifies the incoming card and proceeds with a "full search", meaning the unknown card is compared one by one to all cards in the same file classification until a match is found or it is determined that there is no match. In the case of fingerprints taken from crime suspects, the full search generally yields a "hit" rate of 8 percent, meaning that between the name search and the full search, roughly 55 percent of all criminal fingerprint searches result in a match being found in the file. (Wilson and Woodard, page 3)

In contrast, in non-criminal fingerprint comparisons, FBI data indicate that the name search results in a "hit" five percent of the time and the full search in a "hit" only 1.5 percent of the time. (Wilson and Woodard, page 3). Given this low hit rate and the high cost of performing a full search, most law enforcement agencies limit non-criminal fingerprint checks to a name search only. This means, of course, that a small number of people who would be identified as criminals through a full search are erroneously identified as non-criminals (i.e., people using aliases).

2. What is an AFIS?

An AFIS is a specialized grouping of equipment used to electronically store fingerprints and, by applying pattern recognition techniques, to perform the same comparison of minutiae points that a fingerprint technician performs manually. Functionally, an AFIS encompasses all of the elements of a manual fingerprint identification system, with the exception of the classification system. Specifically, it consists of these components:

(1) Controller Subsystem. The controller is a central computer or central processor which receives commands from the user and directs the activities of other subsystems.

(2) User Interface Subsystem. This encompasses the hardware, firmware and software used to permit the user to enter commands and to see and use data displayed by the system.

(3) Fingerprint Input Subsystem. Fingerprints are input into an AFIS either by direct electronic transfer from a commercially available, inkless fingerprint input terminal or by using a commercially available scanner to input in a manually produced fingerprint card.

(4) Template Creation (or Encoding) Subsystem. This subsystem selects two fingerprints from each fingerprint card input into the system (usually the left and right thumbs or index fingers) and determines the number and location of minutiae on each of the selected fingerprints. For each selected fingerprint, it then creates and stores a file, called "template" or "minutiae map" containing the coordinates of the minutiae.

(5) Image Storage Subsystem. This is the "archive" where file fingerprints and fingerprint templates are stored. Because fingerprint files consume a large amount of memory, fingerprint files are stored on optical media in many systems and the templates used for comparison are stored in magnetic memory.

(6) Searcher (Matching Subsystem). This subsystem, which generally takes the form of one or more standalone computers equipped with special software, compares the template of an unknown fingerprint against templates in the system's database and generates the matching scores described above.

(7) Component Interface Subsystem. This subsystem, which usually takes the form of a local area or wide area network, provides the means for transferring data among the system components.

Using the above-described system, the process for positively establishing identity revolves around three critical steps: (1) scanning the full set of fingerprints from an unknown person in the system, (2) creating the set of templates used in the comparison process, and (3) comparing the set of templates from the unknown person's fingerprints to a similar set of templates taken from every set of fingerprints stored in the database.

After comparing the first unknown template (e.g., the template of the right thumb), to all of the corresponding templates stored on the system (e.g., all right thumb templates), the system assigns a "matching score" which indicates the degree of similarity between the unknown template and each of the file templates: the higher the score, the stronger the likelihood that the unknown template and a file template are from the same fingerprint. The scores are sorted in descending order and the highest scores are generally presented to the system operator in the form of a short "candidate list." When a score is above a certain threshold (defined by the agency using the system), a match is considered to have occurred. When the system finds a match, the operator generally requests that the system display both the unknown template and the matching template and he or she visually confirms the match. The operator also decides, based on agency policies, whether it is necessary to compare the template from the second hand.

While the AFIS is extremely accurate, it has an Achilles Heel (i.e., it has significant drawbacks). As the discussion above has made clear, the AFIS, as currently designed, must compare every set of templates created for an unknown person to the templates for every fingerprint record in the database. Because the automated searcher can only compare about 1,000 templates per second, and because many agencies have millions of fingerprint records in their databases, agencies with large databases must use multiple searchers to simultaneously search segments of the template file. The table below shows the impact of this hardware-intensive method of increasing search capacity assuming a database size of 2 million records.

| Number of Searchers | Number of Searches that Can be Processed per Hour | Estimated Cost of Searchers |
| --- | --- | --- |
| 1 | 1.8 | $210,000 |
| 10 | 18.0 | $2,100,000 |
| 100 | 180.0 | $21,000,000 |

In practice, the direct correlation between productivity gains and cost manifests itself in two ways. First, despite the fact that automated fingerprint searches are known to be far more accurate than manual searches, only a small percentage of the law enforcement agencies in the U.S. use AFIS technology. Second, cost considerations force many agencies that do automate to settle for less-than-optimum level of automation. Stated more specifically, due to high cost of AFIS technology, most agencies that have automated continue to perform only a name search when presented with a request for a non-criminal fingerprint search. This means that criminals using false names continue to go undetected in routine fingerprint searches performed by AFIS equipped law enforcement agencies.

Given the above, it is clear that what is needed is a method to reduce the amount of time required to perform a fingerprint search on an AFIS without proportionally increasing the number of searchers in the system.

B. Automated Fingerprint Classification Systems: A Less Costly Means of Increasing Search Capacity For more than a century, law enforcement agencies have been confronted by the need to increase the search capacity of their manual fingerprint systems without increasing the number of searchers (technicians). Until the advent of the AFIS, the universal response to this challenge was to file fingerprints according to some classification scheme and, when seeking a match for an unknown person's fingerprint card, to search only the portion of the file containing fingerprints of the same classification.

It is obvious to those involved in the development of AFIS technology that a classification system can also be used to reduce search time in an AFIS. Described simply, the use of an automated classification system means that a single searcher, or a small number of searchers, could perform tasks that currently require tens or hundreds of searchers. What is not obvious is the specific classification system that should be used. At least one effort to automate the Henry Classification Method has been reported. (Chang, et. al., *Fingerprint Classification with Model-Based Neural Networks*, abstract presented at National Institute of Standards and Technology on Criminal Justice Information systems, Washington, D.C., September 1993) (Incorporated herein by reference). Other efforts focusing on the automation of a simple seven-category classification system recently developed by the FBI are also ongoing (McCabe: Candela). Both the Henry classification system and the newer classification systems that have been developed have shortcomings which are described below.

1. The Henry Classification System

Despite the fact that the Henry Classification System is the most widely used fingerprint classification system in the world, experts agree that this classification system is unnecessarily complex and that it is particularly ill-suited as a classification system for large fingerprint files. Its shortcoming in this regard has its roots in the first step of the classification process. In the first step of the Henry classification process, each fingerprint on a 10-fingerprint card is classified and assigned an alpha-numeric code corresponding to one of two primary categories: the whorl or the non-whorl. The fingerprint card is then classified using a designator derived from the code assigned to each finger.

By applying the two primary categories identified above to all ten fingers, a fingerprint file can be theoretically broken into a total of 1,024 distinct classifications ($2^{10}$). In practice, however, fingerprints corresponding to some of the 1,024 classifications seldom if ever appear in a file and some classifications are extremely common. In fact, in the U.S., one primary classification in any file organized using the Henry System is likely to contain 25 percent of all of the cards in the file. In all but the smallest fingerprint files, it is therefore necessary to further subdivide the file. In recognition of this fact, the original Henry Classification System provides for three further levels of subdivision:

(1) Secondary Classification. At this level, fingerprint cards within the same primary classification are subdivided according to the patterns of the index fingers. Index fingers are classified into one of five pattern types, meaning that each primary classification can be theoretically divided into 25 secondary classifications.

(2) Subsecondary Classification. Fingerprint cards within the same primary and secondary classification are classified according to the patterns (three) of the middle, ring, and index fingers, meaning that each secondary classification can be theoretically divided into 81 subsecondary classifications.

(3) Major Division. Fingerprint cards within the same primary, secondary, and subsecondary classifications are classified according to the patterns (three) of the thumbs, meaning that each subsecondary classification can be theoretically divided into 12 major divisions.

Various studies have shown that the largest Major Division in a fingerprint file organized using the classification scheme described above is likely to contain approximately 6 percent of the total number of fingerprint cards in the file. While this represents an adequate degree of division in a very small fingerprint file, it is positively inadequate for organizations such as the U.S. FBI or the State of California which have 23 million and 7.5 million cards on file respectively. Such organizations have been forced to add additional levels of subdivision to the original Henry System. Obvious drawbacks of using new subdivisions to remedy the inherent shortcomings of the Henry system are these:

1. The application of increasingly complex rules adds time to the classification process, driving up labor costs and reducing productivity.

2. The application of increasingly complex rules increases the risk of misclassification which, in turn, increases the incidence of missed identifications.

While the above discussion focuses on the application of the Henry Classification System in a manual fingerprint system, it is pertinent to automated systems as well. Just as in a manual system, the extensive number of subdivisions required to achieve adequate segmentation of the database would impact the speed of the classification process and the potential for misclassification.

Thus what is needed is a classification system that results in adequate segmentation of the database without extensive use of subdivisions.

2. Seven-Category classification System Being automated by FBI

Recognizing the above, the U.S. FBI is supporting research and development on automated classification systems that use primary categories only and no subcategories. The previously cited Candela report described ongoing attempts to automate a five-category classification system and the previously cited McCabe report describes a seven-category classification system being investigated by the U.S. FBI. Despite the fact that a 7-category classification system, when applied to all ten fingers on a fingerprint card, creates the theoretical possibility for more than 2 billion separate file classifications, the McCabe report stated that the level of segmentation achieved by the seven-category classification system is, in practice, inadequate for large systems such as that of the U.S. FBI. To illustrate, the author pointed out that one category, the ulnar loop, will typically contain 6% of the records in a database. Given the size of the FBI's database and a processing requirement of 225 searches per hour, the report stated that the FBI would need 483 searchers to process the ulnar loop classification alone if the seven-category classification system were used (page 9).

Given the above, one can see that the ideal classification system is one that uses more primary categories than the Henry System and a less complex system of subclassification.

3. The Vucetich Classification System classifications, McCabe reported that the largest file classification could still be expected to contain 6 percent of the file's records—the same number reported by the Federal Police of Argentina using Vucetich's four primary classifications.

TABLE A

|  | Vucetich System | Henry System | 7-Category System (McCabe) |
|---|---|---|---|
| Primary Classification Categories |  |  |  |
| Number of primary categories | 4 | 2 | 7 |
| Theoretical number of resulting file subdivisions | 1,048,578 | 1,024 | >2 billion |
| Approximate size of largest file subdivision after primary categories have been applied | = 3.5% of records in file | = 25% of records in file | = 6% of records in file |
| Subcategories |  |  |  |
| Levels of Subdivision | one | three | none |
| Approximate size of largest file subdivision after all levels of subdivision have been applied | = 0.0025% of records in file (in loop subcategories) | = 6% of records in file | not applicable |

Such a classification system exists and is a basis for the present invention. Developed by Juan Vucetich in the 1880s and introduced in Argentina, the Vucetich system is used by various Latin American countries and is widely recognized by experts as superior to and simpler than the Henry method.

As table A shows, the Vucetich classification method begins by assigning each fingerprint on a fingerprint card an alpha-numeric code corresponding to one of four primary categories. By applying four primary categories to all ten fingers (rather than the two applied by Henry), the Vucetich Classification System provides for a theoretical total of 1,048,578 distinct classifications ($4^{10}$) (rather than the 1,024 provided by the Henry System). In practice, of course, only a small portion of the classifications that are theoretically possible actually appear in a fingerprint file. The Federal Police of Argentina (PFA), which maintains one of the largest files based on the Vucetich Classification System, reported in 1984 that its 6 to 7-million-card file contains only 3.5% of the classifications that are theoretically possible. (Rosset and Lago, *El ABC del Dactiloscopo*, Editorial Policial, Policia Federal Argentina, Buenos Aires, Argentina, I.S.B.N. 950-9071-08-0, 1984, page 98) (Incorporated herein by reference). The PFA also observed that certain classifications are far more prevalent than others; however, they indicated that the largest primary classification in their files contains about 200,000 records, or approximately 3.5% of the total records in their file—a level of subdivision of achieved by the Henry method after applying four levels of classification and subclassification! By applying a single level of subclassification to the primary Vucetich loop classifications, the PFA reported that most of the resulting subdivisions contain between 20 and 50 cards, while a few contain up to 150 cards, or 0.0025 percent of the cards in the file (page 100).

Table A also demonstrates that increasing the number of primary categories in a fingerprint classification scheme beyond the four categories used by Vucetich does not necessarily result in greater segmentation of the file. Although the seven-category system described by McCabe theoretically results in more than 2 billion separate file

SUMMARY OF THE INVENTION

The present invention is directed to an automated fingerprint classification and identification system used to determine or verify the identify of an unknown person by comparing one or more of the person's fingerprints (i.e., the unknown fingerprints) to known fingerprints stored in a database. In addition to the components generally present in an automated fingerprint identification system (AFIS), the invention adds: (1) an apparatus and method for automatically classifying and storing the fingerprints in the database according to a widely used manual 10-fingerprint classification method (the Vucetich classification method), and (2) an apparatus and method for limiting the search of the database to only those fingerprints that are of the same classification as the unknown fingerprint(s). By endowing the standard AFIS with automated fingerprint classification and storage features, the invention reduces the amount of time required for an AFIS system's "matcher" (the processing unit that searches the database) to complete a database search, thus increasing the speed of the system and/or reducing the number of matchers required to obtain a desired processing speed. By using the Vucetich classification method instead of other commonly used 10-fingerprint classification methods, the efficiency gain is maximized.

In practical terms, the effect of the invention is to lower the cost of the equipment required to perform automated fingerprint searches while preserving the accuracy of state of the art systems.

The present invention, in contrast to conventional AFIS, uses a dual strategy to reduce the amount of time required to perform a single fingerprint comparison. First, like the standard AFIS, it uses raw processing speed and, in the case of large databases, parallel processors. Second, it uses an automated classification system to limit the number of fingerprints to which an unknown print must be compared in order to determine if there is a match in the systems database. The resulting system, an automated fingerprint classification and identification system (AFCIS), provides the same level of accuracy as the present-day AFIS. Importantly, however, it allows its users to achieve productivity gains that are equal to or greater than those achieved using the standard AFIS at a far lower cost.

The present invention uses a classification scheme that, while recognized as being among the best manual classification systems in the world, has not been used as the basis for any automated classification system. Additionally, the present invention uses a neural network pattern recognition approach that mimics the human process of recognizing and classifying fingerprints that is distinct from other classification approaches that have been reported.

As mentioned above, a feature and advantage of the present invention is that it reduces, in a large system, the number of automated "searchers" required to carry out a fingerprint comparison. (The searcher is an AFIS component used to perform a sequential search of the database to find a match for an unknown fingerprint. In large systems, multiple searchers are generally used to simultaneously search assigned segments of the database so that the amount of time required to complete the search is reduced.) The savings can amount to millions of dollars when an agency's fingerprint files contain a million or more records. For example, cost and design data from the previously cited McCabe report, and from a report by the U.S. Congress Office of Technology (Congress of the United States, Office of Technology Assessment, The FBI Fingerprint Identification Automation Program's Issues and Options, OTA-BP-TCT-84, November 1991) (incorporated herein by reference) indicate that the FBI's AFIS, if implemented according to current plans, would require 483 automated searchers (at a cost of roughly $210,000 apiece) to perform 900 searches per hour on a database containing approximately 2 million records. As an example included in this patent application illustrates, the present invention can perform an even greater number of searches per hour using a single automated searcher.

That the present invention is not obvious is apparent from the fact that there is no mention in the literature discussing the need for, or the development of, automated fingerprint classification systems that make mention of the particular classification scheme used by the invention. While the selected scheme predates the Henry Classification System (the dominant classification scheme in the world) and is lauded by some experts for its simplicity and practicality, it is used only in a handful of South American countries in limited format as a manual system.

Attempts to automate the classification of fingerprints have, over the past 15 years, generally followed four different approaches: syntactic, structural rulebased, and artificial neural networks (see Candela and Chellappa).

In contrast to these approaches, the present invention uses a software decision tree which emulates human perception. Unlike other methods, it does not use rules that are translation, orientation, or scaling based to translate fingerprints from their visual form into a mathematical form before classification, nor does it compare the prints to templates to locate common characteristics. The present invention keeps the prints in graphical form and carries out a decision-making process comparable to that of a human being trained in the use of the Vucetich Classification System. While specifically noting that the use of "decision tree" classifiers has not been attempted previously, Candela and Chellappa identify this approach as one that merits evaluation. However, it should be pointed out it is the use of the decision tree approach in combination with the Vucetich Classification System that advances the state of the an of fingerprint classification. Because a decision tree-based system carries out the decision making process in much the same way that a human being does, a complex classification method such as the Henry method does not lend itself for use with a decision tree. (Just as the complex rules applied by the Henry System make the human decision making process slow and error prone, the automatic decision making process would be slow and error-prone.)

On the other hand, while single-tier classification schemes such as those that have been described previously could arguably be incorporated in a decision tree system, the level of segmentation provided by such systems has already been shown to be inadequate. Thus, unless used in combination with a classification system such as the Vucetich Classification System, the use of a software decision tree for fingerprint classification does not have significant advantages over other methods of classification.

Further features and advantages of the present invention, as well as the structure and operation of various embodiments of the present invention, are described in detail below with reference to the accompanying drawings.

DETAILED DESCRIPTION OF THE PREFERRED EMBODIMENTS

I. General Overview

The present invention relates to an automated fingerprint classification and identification system (AFCIS) which automatically classifies fingerprints according to the primary Vucetich fingerprint categories and developed subclassifications. The present invention is described in terms of its components, which are shown in the block diagram of FIG. 1 and discussed in Section A below, and in terms of operation, which is depicted in FIGS. 2A–2E and discussed in Section B below.

A. System Components

Figure 1:
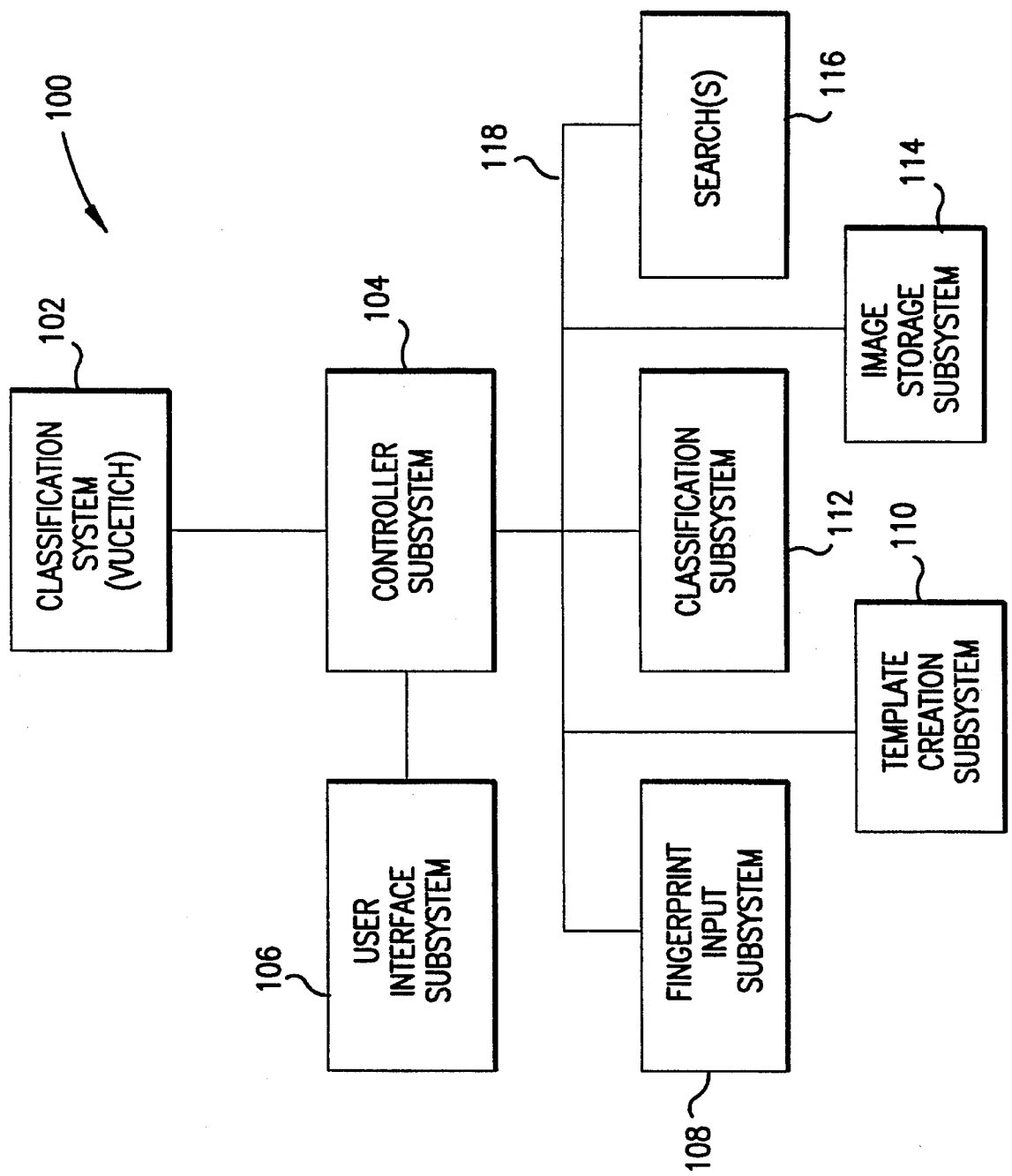
FIG. 1 is a high level block diagram of an AFCIS 100 according to a preferred embodiment of the present invention.
Figure 2A:
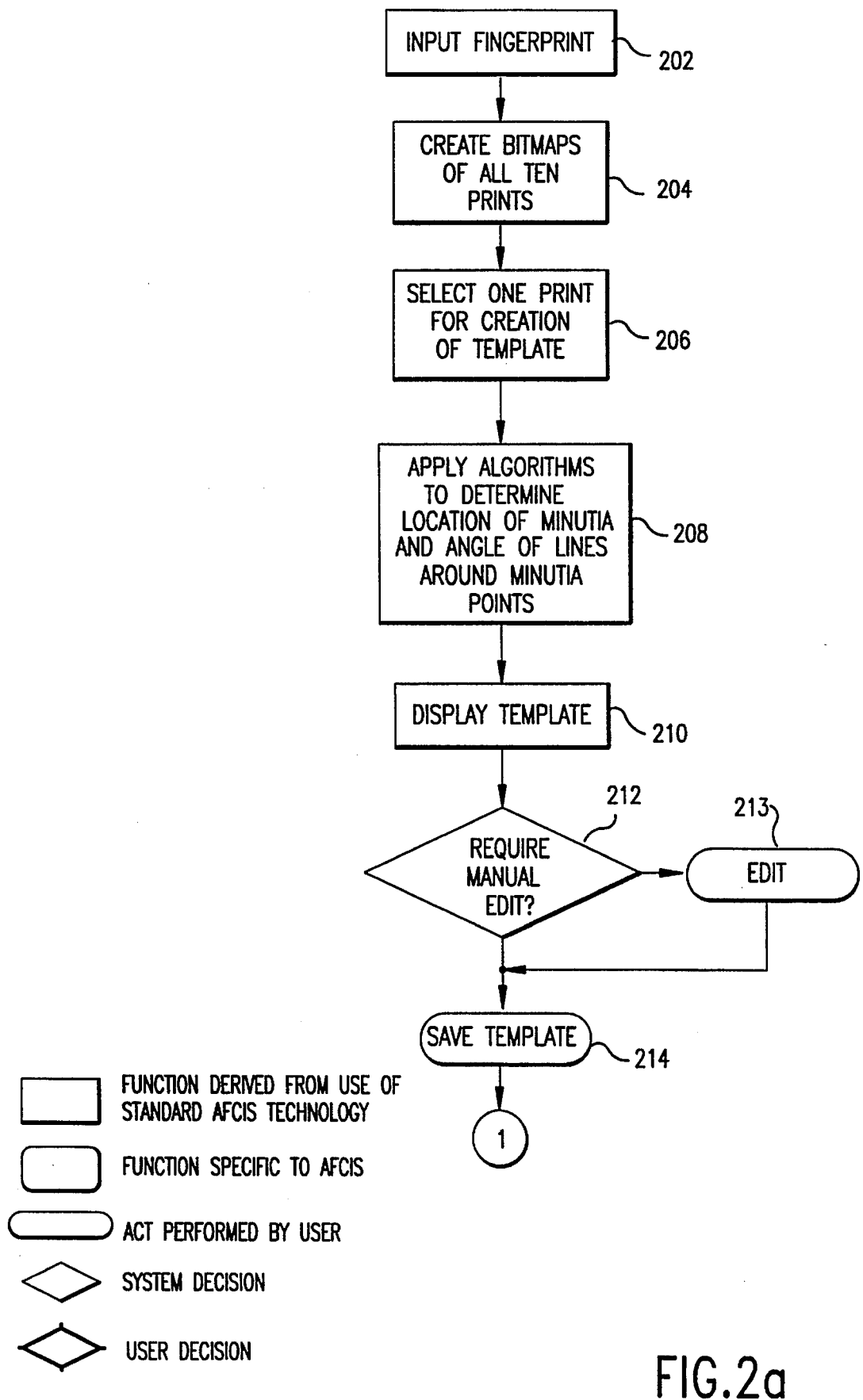
FIGS. 2A–2E (generally referred to as FIG. 2) are flow diagrams showing how searches are performed using an AFCIS and how new records are added to the system according to a preferred embodiment of the present invention.
Figure 2B:
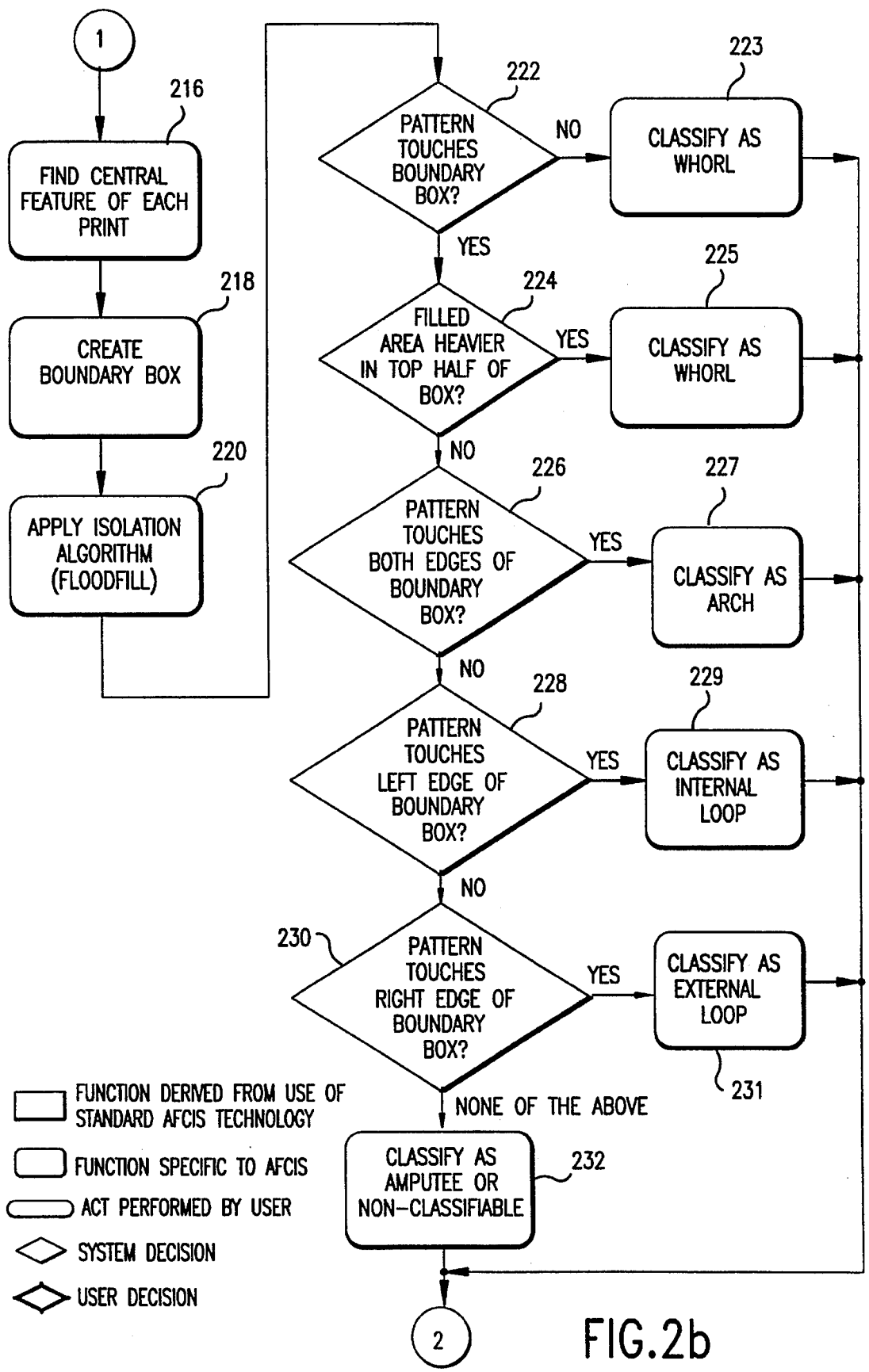
Figure 2C:
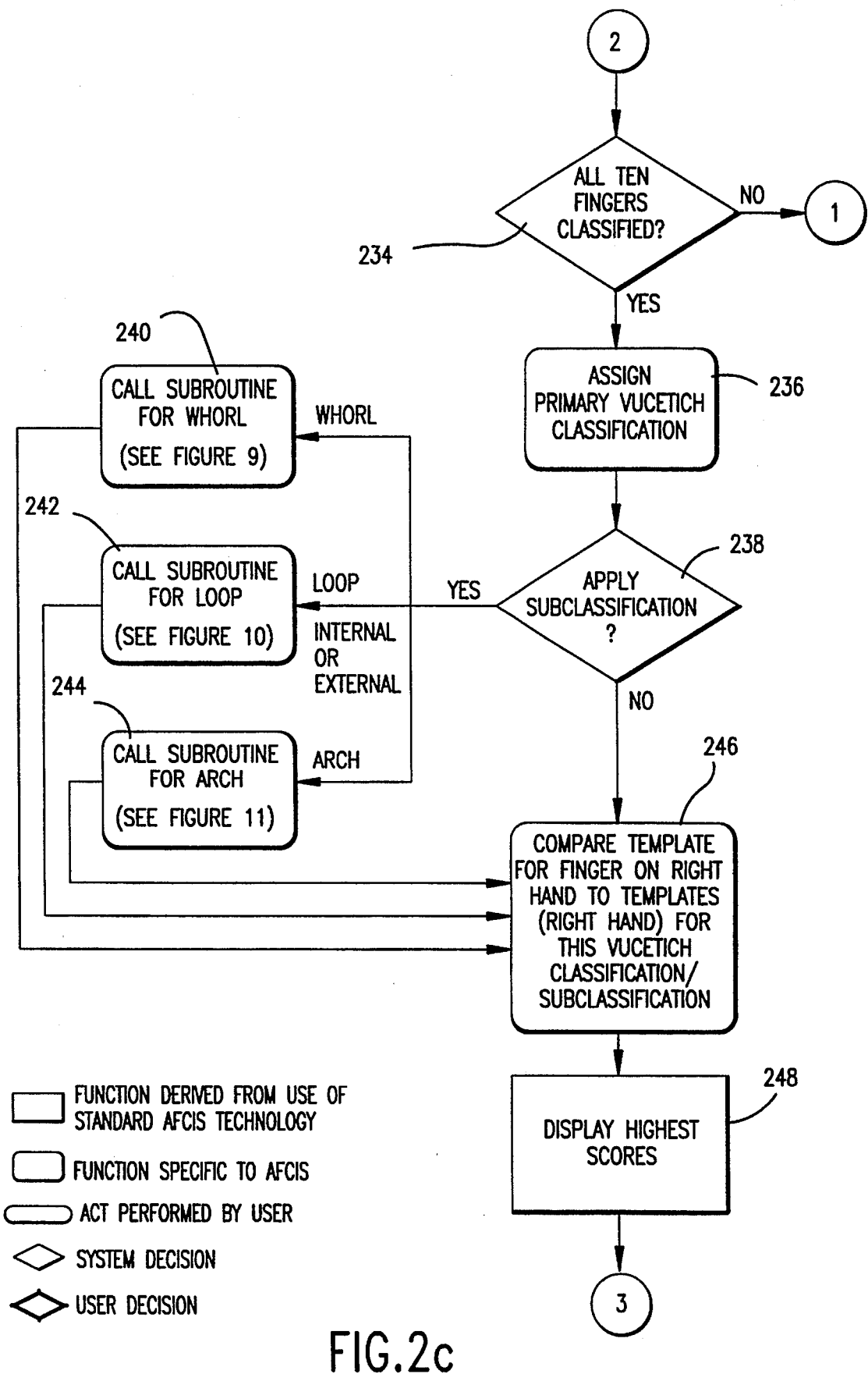
Figure 2D:
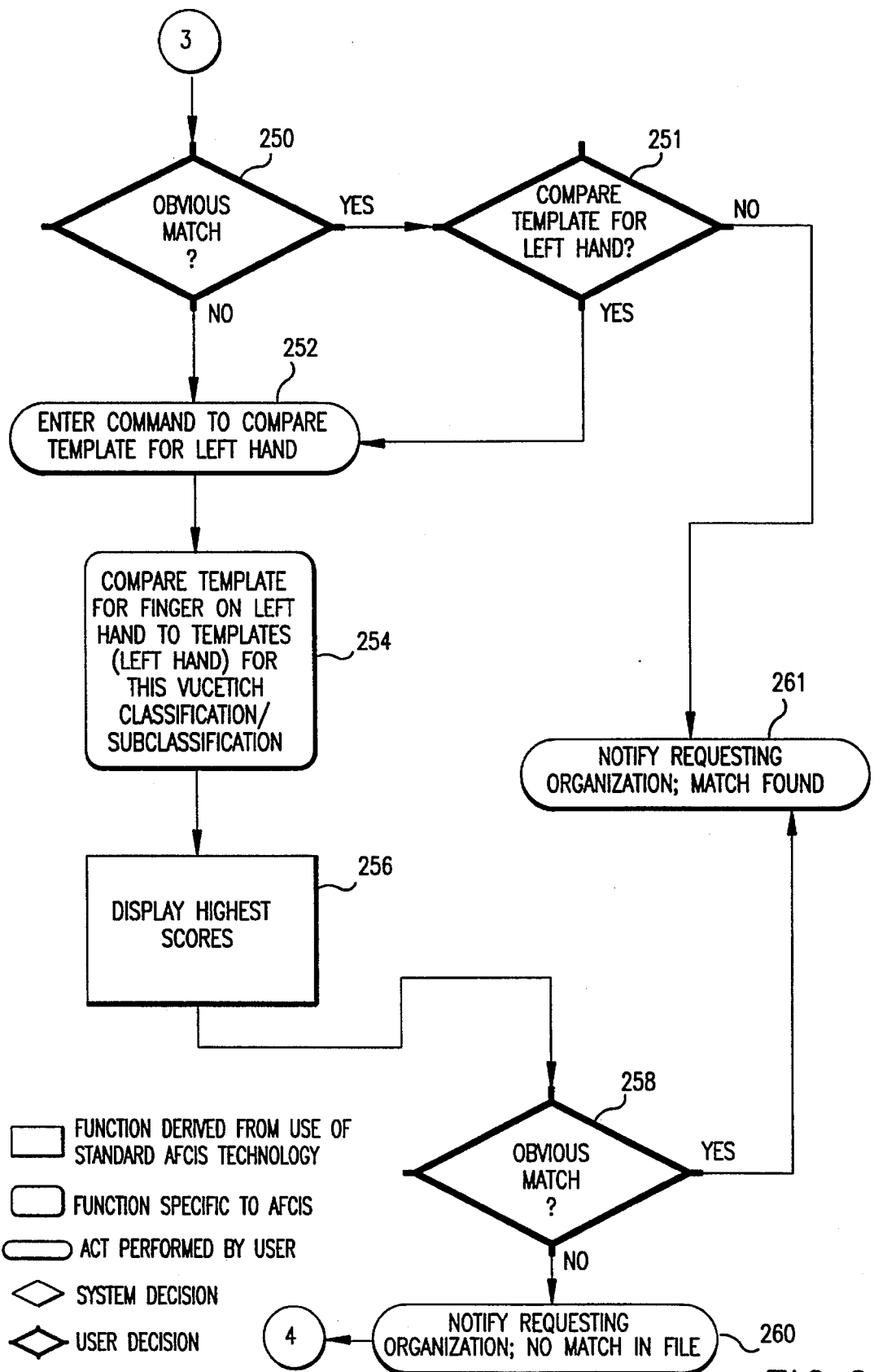
Figure 2E:
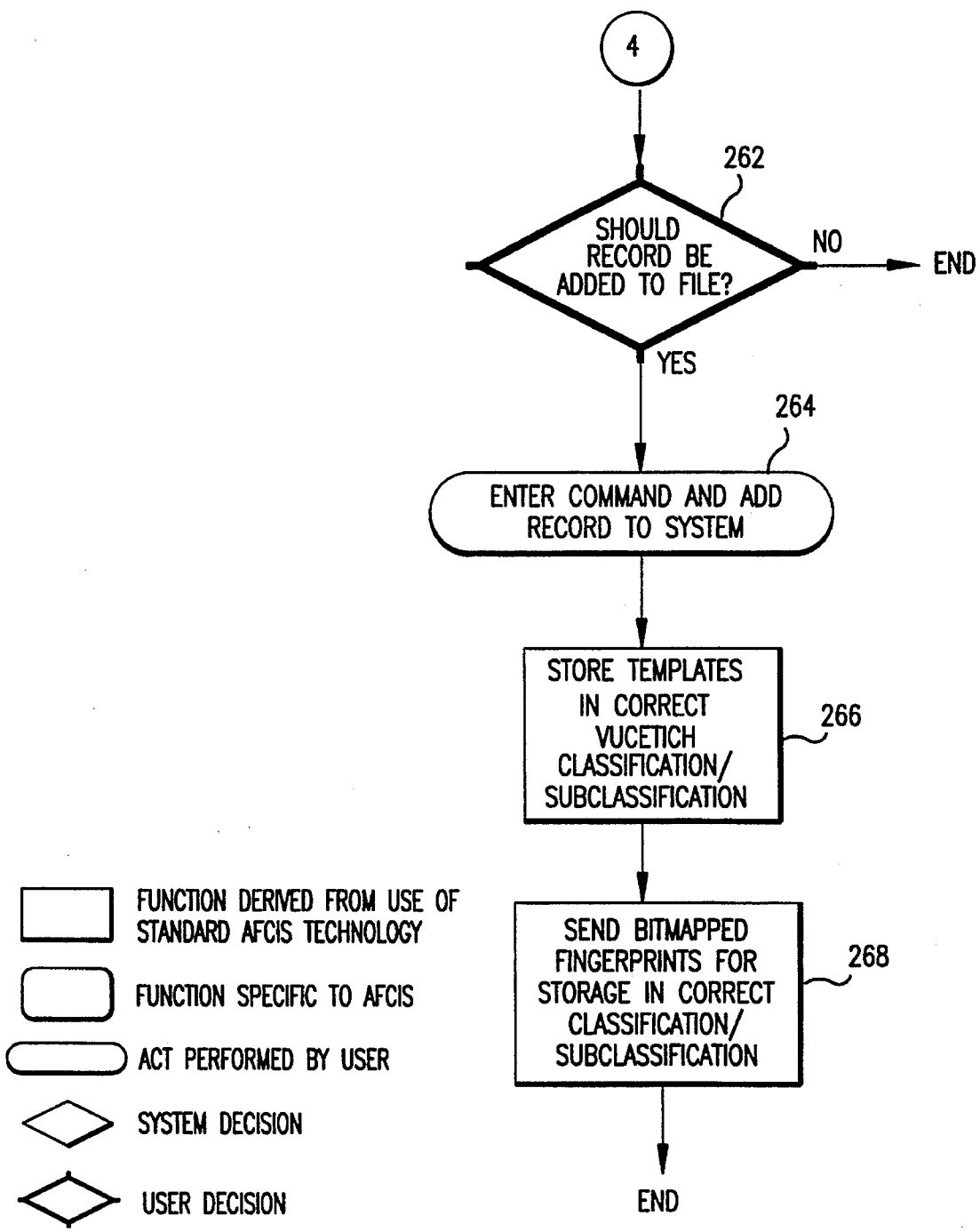
Figure 3A:
FIGS. 3A through 3D depicts examples of the Four Primary Fingerprint Categories used by the Vucetich Classification System according to a preferred embodiment of the present invention.
Figure 3B:
Figure 3C:
Figure 3D:

FIG. 1 is a high level block diagram of an AFCIS 100 according to a preferred embodiment of the present invention. The AFCIS includes: a classification system 102, a controller subsystem 104, a user interface subsystem 106, a fingerprint input subsystem 108, a template creation subsystem 110, a classification subsystem 112, an image storage subsystem 114, one or more searchers 116, and a component interface subsystem 118. Each component of the AFCIS 100 is discussed in the subsections below.

1. Vucetich Classification System 102

The classification system 102 employed by the AFCIS 100 of FIG. 1, serves the same function as a classification system in a manual file system. That is, it limits the number of fingerprint records against which an unknown record must be compared in order to find a match. In theory, any fingerprint classification system could be used in an AFCIS to perform this function. A distinguishing feature of this invention, however, is its use of the primary classifications of Juan Vucetich (as described by Rosset and Lago) in combination with a single level of subclassification within each primary category. The subcategories can take the form of the subclassifications originally developed by Juan Vucetich (as described by Rosset and Lago) or, alternatively, other single-level subclassification schemes can be used. In the preferred embodiment of the invention, which is the embodiment described here, the subcategories used are those used by the Federal Police of Argentina (as described by Rosset and Lago).

a. Primary Categories

In accordance with the Vucetich Fingerprint Classification System, as currently applied by the Federal Police of Argentina, 10-finger fingerprint cards are classified on the basis of the classifications of each of the 10 fingers. As a first step in the classification process, each fingerprint on a card is assigned to one of four primary categories based on the pattern of the ridges of the fingerprint. The primary categories, shown in FIGS. 3A–3D, are: the Arch 302, the Internal Loop 304, the External Loop 306, and the Whorl 308. The alpha-numeric codes corresponding to each primary category are shown in Table B below.

TABLE B

| Category | Alphanumeric Code | |
|---|---|---|
| | Thumb | Fingers |
| Arch | A | 1 |
| Internal Loop | I | 2 |
| External Loop | E | 3 |
| Whorl | W | 4 |

In the event that a fingerprint cannot be classified within any of the above primary categories, an X is used as the code. If there is no fingerprint for a finger (i.e., in the case of an amputee), a designator (C) is used to show that the finger is missing.

Once each fingerprint on the card has been classified, the fingerprint card is classified using a fractional designator that consists of the alphanumeric codes for representing the thumb, index, middle, ring, and little finger of the right hand over the thumb, index, middle, ring, and little finger of the left hand. For example, the designator for a fingerprint card containing 10 fingerprints, all of which are classified as arches, is:

$$\frac{A1111}{A1111}$$

The designator for a card on which the right thumb is an Arch, the remaining fingers of the right hand are External Loops, the left thumb is a Whorl, and the remaining fingers of the left thumb are Internal Loops is:

$$\frac{A2222}{W3333}$$

b. Subcategories

The above-described primary classification scheme can theoretically result in a total of 1,048,587 separate classifications in a file or database; however, only a small percentage of the possible combinations actually occur in a file or database. Thus, to break a file or database down into smaller segments, the four primary classifications are divided into subcategories. As noted previously, in the preferred embodiment of the invention, the subcategories used are those described by Rosset and Lago. The subsections below briefly describe these subcategories.

(1) Subcategories of the Arch Category

Per the description of Rosset and Lago, fingerprints (of the right hand only) that fall within the Arch Category are subcategorized based on the inclination of their crests and the shape of the arch. The arch subcategories and their designators are as follows. Examples of each of the subcategories are provided in FIGS. 6A–6B.

| Subclassification | Code |
|---|---|
| Perfect Arch | 6 |
| Left-leaning arch | 7 |
| Right-leaning arch | 8 |
| Pyramid arch | 9 |

(2) Subcategories of the Internal/External Loop Categories

Figure 5A:
FIG. 5A through 5I depict examples of Loop (Internal and External) Subcategories according to a preferred embodiment of the present invention.
Figure 5B:
Figure 5C:
Figure 5D:
Figure 5E:
Figure 5F:
Figure 5G:
Figure 5H:
Figure 5I:

Fingerprints of the right hand in the internal and external loop categories are divided into nine subcategories based on the number of crests in fingerprint. The categories and their designators are shown below, with examples provided in FIGS. 5A–5I. In applying these subcategories, the crests are counted from the delta (a feature known to those skilled in the art of fingerprint classification) which is shown in FIGS. 5B at 502 to the central feature of the fingerprint (a point also known to those skilled in the art of fingerprint classification) which is shown at FIG. 5B at 504 or to the head of the axis line (i.e., the central crest, or "line of Galton" which are terms known to those skilled in the art). Other rules applied in counting crests are set forth in Rosset and Lago.

| Subclassification | Code |
|---|---|
| 2–4 crests | A |
| 5–8 crests | B |
| 9–12 crests | C |
| 13–15 crests | D |
| 16–18 crests | E |
| 19–21 crests | F |
| 22–24 crests | G |
| 25–27 crests | H |
| 28 or more crests | I |

(3) Subcategories of the Whorl Category

Fingerprints of the right hand in the whorl category are divided into 15 subcategories based on patterns and inclinations of the whorl. The categories and their designators, which are fully described by Rosset and Lago, are shown below, with examples provided in FIGS. 6A–6D.

| Subclassification | Code |
|---|---|
| Left-leaning spiral | A |
| Right-leaning spiral | B |
| Clean circumference | C |
| Interrupted circumference | D |
| Right-leaning central simple sinuosity | E |
| Left-leaning central simple sinuosity | F |
| Right-leaning central compound sinuosity | G |
| Left-leaning central compound sinuosity | H |
| Prolonged left sinuosity | I |
| Prolonged right sinuosity | J |
| Perfect oval | K |
| Interrupted oval | L |
| Open oval | M |
| Independent sinuosity | N |
| Trideltas | O |

2. Controller Subsystem 104

The Controller Subsystem 104 of FIG. 1, serves the same function in an AFCIS as it does in an AFIS. That is, it receives instructions entered by the user and acts upon the instructions by performing a processing step or by instructing another component of the system to perform a processing step. Depending on the number of fingerprint files contained on the AFCIS 100, the number of people using the system, and the number of fingerprint comparisons the system is required to perform each day, the Controller Subsystem 104 can take the form of a microcomputer, a workstation-class computer, a mini-mainframe computer, or a mainframe computer.

In an AFCIS 100 housing a small database of fingerprints (under 100,000) it is not uncommon for the Controller 104 and the elements shown as 106, 108, 110, 112, 114, 116, and 118 to reside on the same computer (as Controller 104). In larger systems, the Controller 104 is generally a standalone computer that sends data to and receives data from the other elements via a communications subsystem 118, which in the preferred embodiment is a Local Area Network communication bus.

3. User Interface Subsystem 106

The user interface subsystem 106 of FIG. 1 encompasses the hardware and software used to permit users to enter data and to display data for the operator's review. In a preferred embodiment of this invention, the user interface subsystem 106 includes a large color monitor at each computer terminal that is used for template creation (see Subsection B.5 below, Template Creation Subsystem) and at each computer terminal where the results of fingerprint comparisons are visually confirmed (See Subsection B.8 below, Searchers). The preferred embodiment also includes, on all display terminals, the use of pull-down menus and pop-up dialog boxes for data entry. These user interface features are common in off-the-shelf components likely to be used in an AFCIS (e.g., AFIS's commercially available from NEC or its distributors or from Cogent Systems, Alhambra, Calif., U.S.A. or its distributors) and are in keeping with current trends in software design.

4. Fingerprint Input Subsystem 108

As in an AFIS, the Fingerprint Input Subsystem 108 of FIG. 1 can take one of two forms. At the lower end, the input subsystem 108 can consist of a flat-bed electronic scanner capable of 600 dpi resolution or better. The device is used to scan in fingerprint cards created manually (by methods well-known to those in the field of law enforcement) into the AFCIS 100. Such scanners are available commercially from a large number of sources.

Alternatively, the input system 108 can use live scan fingerprint scanning devices which capture a person's fingerprints without the use of ink. Such systems are currently used in many AFIS systems, including units manufactured by Digital Biometrics, Inc. (Minnetanka, Minn., U.S.A.) and Identix (Sunnyvale, Calif., U.S.A.).

Whether a flat-bed scanner or a live scan unit is used, the fingerprint input subsystem 108 is used to scan in the fingerprint and create a bitmap file of the fingerprints. The bit map file is then forwarded to a temporary storage location within memory of the input subsystem 108 until it is retrieved by a system operator using an Encoding Subsystem (template creation subsystem 110, which is described in subsection 5 below). In a preferred embodiment of this invention, the Digital Biometrics TENPRINTER® is used as the fingerprint input subsystem. The Digital Biometrics unit is preferred because it is widely used and contains software that makes it possible to view the fingerprint as it is being rolled to more easily control the quality of fingerprints entered into the system.

5. Template Creation (or Encoding) Subsystem 110

The Template Creation Subsystem 110 of the AFCIS 100 consists of off-the-shelf hardware and software components which fulfill the same function as in an AFIS. That is, this subsystem selects two fingerprints from each set of fingerprints scanned into the system (usually left and right thumbs or index fingers) and determines the number and location of minutiae on each of the selected fingerprints. For each selected fingerprint, it then creates a file called a "template" or "minutiae map" containing the coordinates of the minutiae. In the preferred embodiment of the invention, this subsystem takes the form of a microcomputer or workstation-class computer equipped with software from Cogent Systems, Inc. Where the AFCIS database contains fewer than 100,000 records and where there are few system users, the host computer of the template creation subsystem 110 can be the same as that used for the Controller Subsystem 104. For larger systems, one or more separate microcomputer or workstation-class terminal(s) is (are) employed for template creation subsystem 110.

6. Classification Subsystem 112

The Classification Subsystem 112 of FIG. 1 consists of a software decision tree (employed by the controller subsystem 104) in which algorithms are applied in order to derive the primary Vucetich classification for a 10-finger fingerprint record and, at the discretion of the agency where the system is installed, to derive a subclassification for the 10-fingerprint record as well.

Once the record has been classified and the operator has determined whether or not the record should be added to the system, the Controller Subsystem 104 instructs the image storage subsystem 114 to store the fingerprint record in the segment of the database that corresponds to the record's classification. Similarly, the Controller Subsystem 104 instructs the image storage subsystem 114 to store the templates which are used to perform fingerprint comparisons in a segment of the template database that corresponds to the record's classification.

Figure 6A:
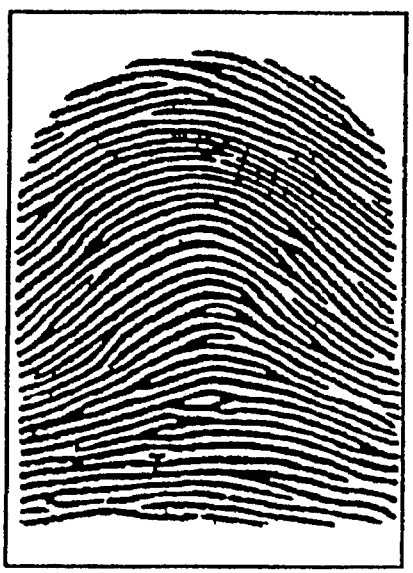
FIGS. 6A through 6D depict examples of Arch Subcategories according to a preferred embodiment of the present invention.
Figure 6B:
Figure 6C:
Figure 6D:
Figure 7A:
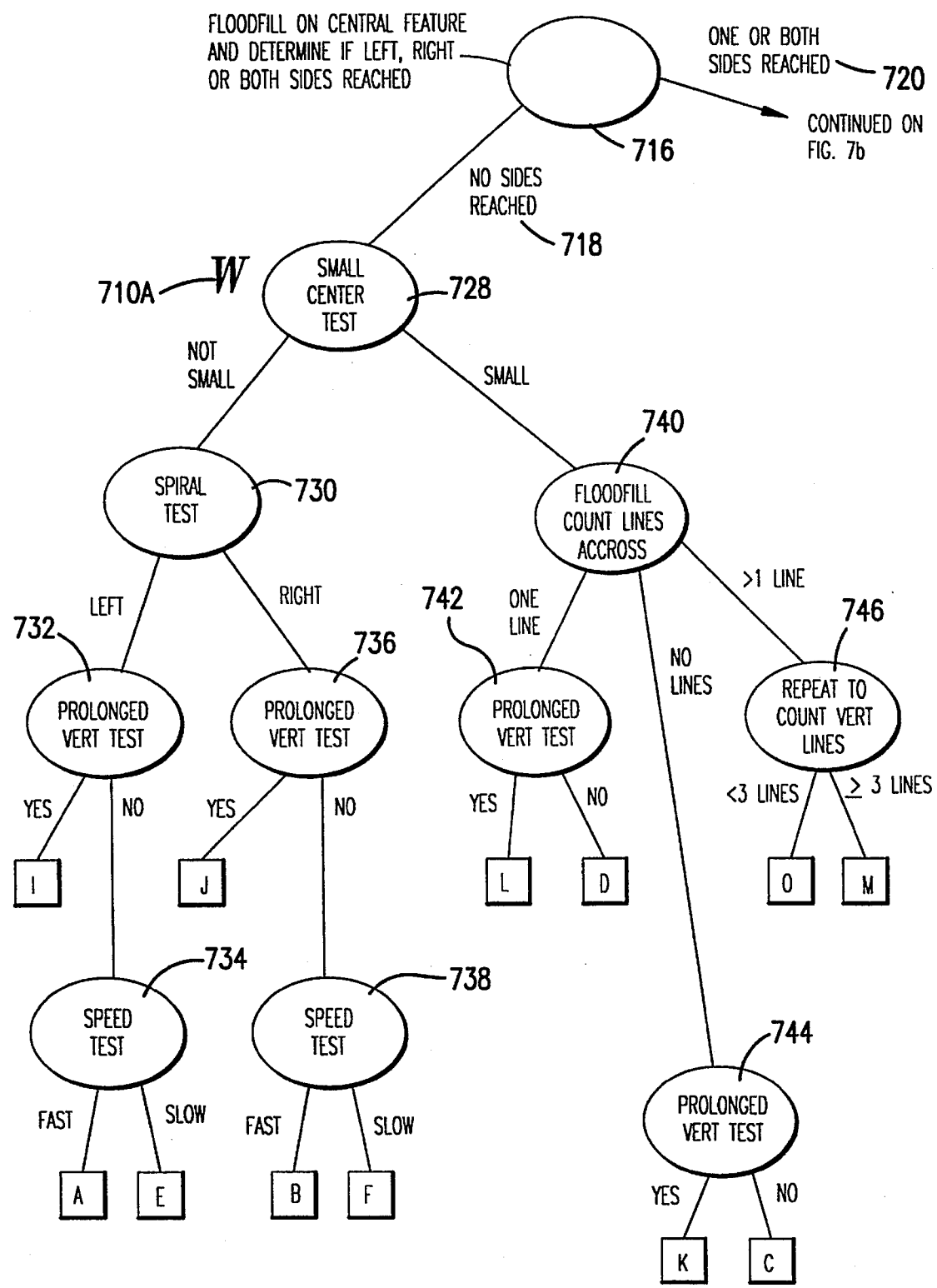
FIGS. 7A and 7B are classification software decision tree 700 employed by the AFCIS 100 according to the present invention.
Figure 7B:
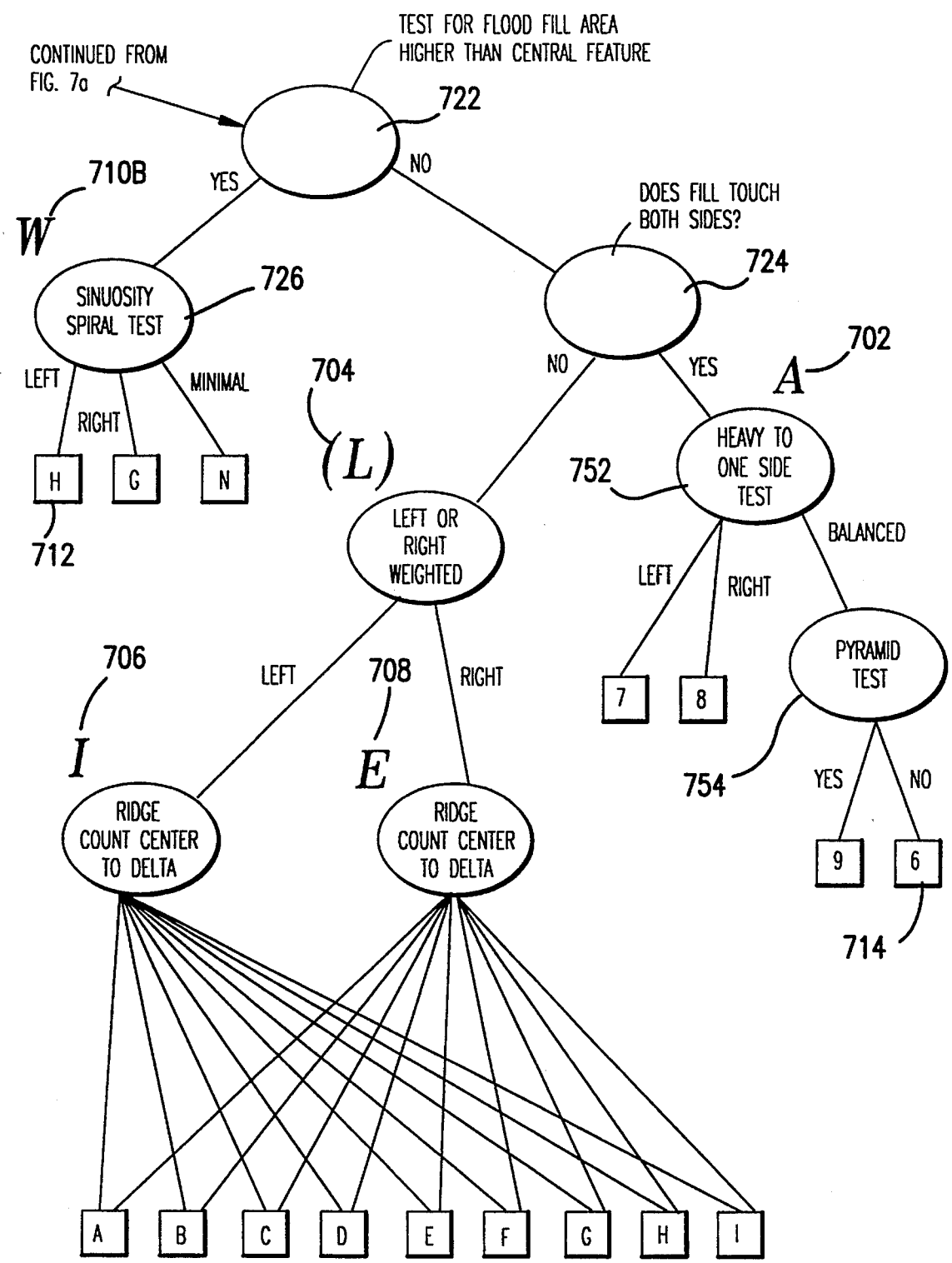

The software decision tree of the AFCIS 100 is depicted in FIG. 7A–7B. The large letters on the figures [i.e., the A, (L), I, E, and W at points 702, 704, 706, 708, and 710A and B] correspond respectively to the primary categories of Arch (A), Internal Loop (L) and I, External Loop (L) and E, and Whorl (W) as shown in FIG. 3A–3D as examples. The letters and numbers in squares on FIG. 7A–7B (see, for example, 712 and 714) reflect the subclassifications described by Rosset and Lago which were discussed previously and which are shown in FIGS. 3A–3D, 4A–4D, 5A–5I and 6A–6D.

a. Determining Primary Classifications

To determine the primary classification of a 10-finger fingerprint record, the software of this invention carries out a decision making process using the Vucetich Classification System. The process begins at the topmost node of the decision tree shown in FIG. 7A, at point 716. After copying the bitmap of the first print in the set of fingerprints to be classified, the classification software calls the minutiae extraction software of the Template Creation Subsystem to determine the point coordinates of the central feature. (This is a function well within the capabilities of the minutiae extraction programs used in AFIS systems produced by vendors such as NEC and Cogent Systems.) The central feature is the innermost point of the fingerprint and, for the purposes of the decision tree software, is a point to which all other data are related.

Once the central feature is located, the software of the invention creates a bounding rectangle inside the ellipse of the original print by drawing a line through the central feature's coordinate at a 30 degree angle to the right of vertical until it runs out of print to 30° of vertical. This becomes two corners. The procedure is then repeated to the left to create the other two corners. The four corner coordinates are then connected with black lines.

Once the boundary box has been created, the software determines whether the central feature is black or white (i.e., whether it is a ridge or valley). If the central feature coordinate is a black pixel, the software moves up until it reaches a white pixel. The software then calls a floodfill algorithm (an algorithm commonly used in computer graphics software) which essentially follows the valley, coloring it until the entire valley is filled in. The software then moves to the next valley up from the central feature and repeats the "coloring" process. It then moves to the next nearest valley and repeats the process again. The result is a bitmap in which the three valleys have been "colored".

Figure 8A:
FIGS. 8A through 8F show examples of Bitmapped Fingerprints Before and After "Floodfill."
Figure 8B:
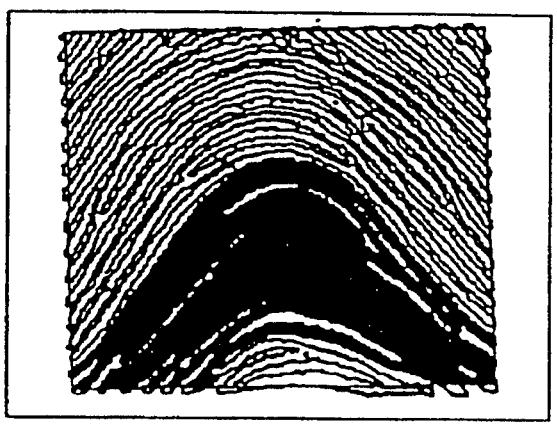
Figure 8C:
Figure 8D:
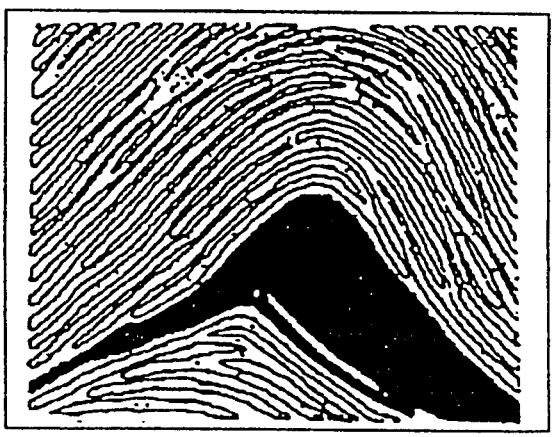
Figure 8E:
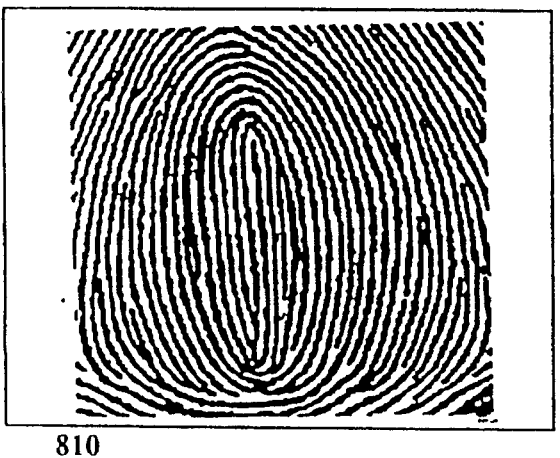
Figure 8F:
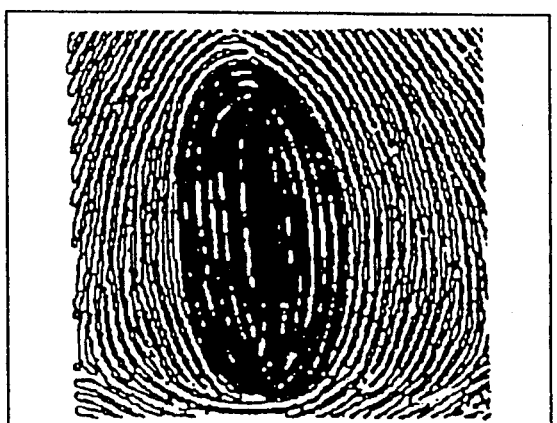
Figure 9A:
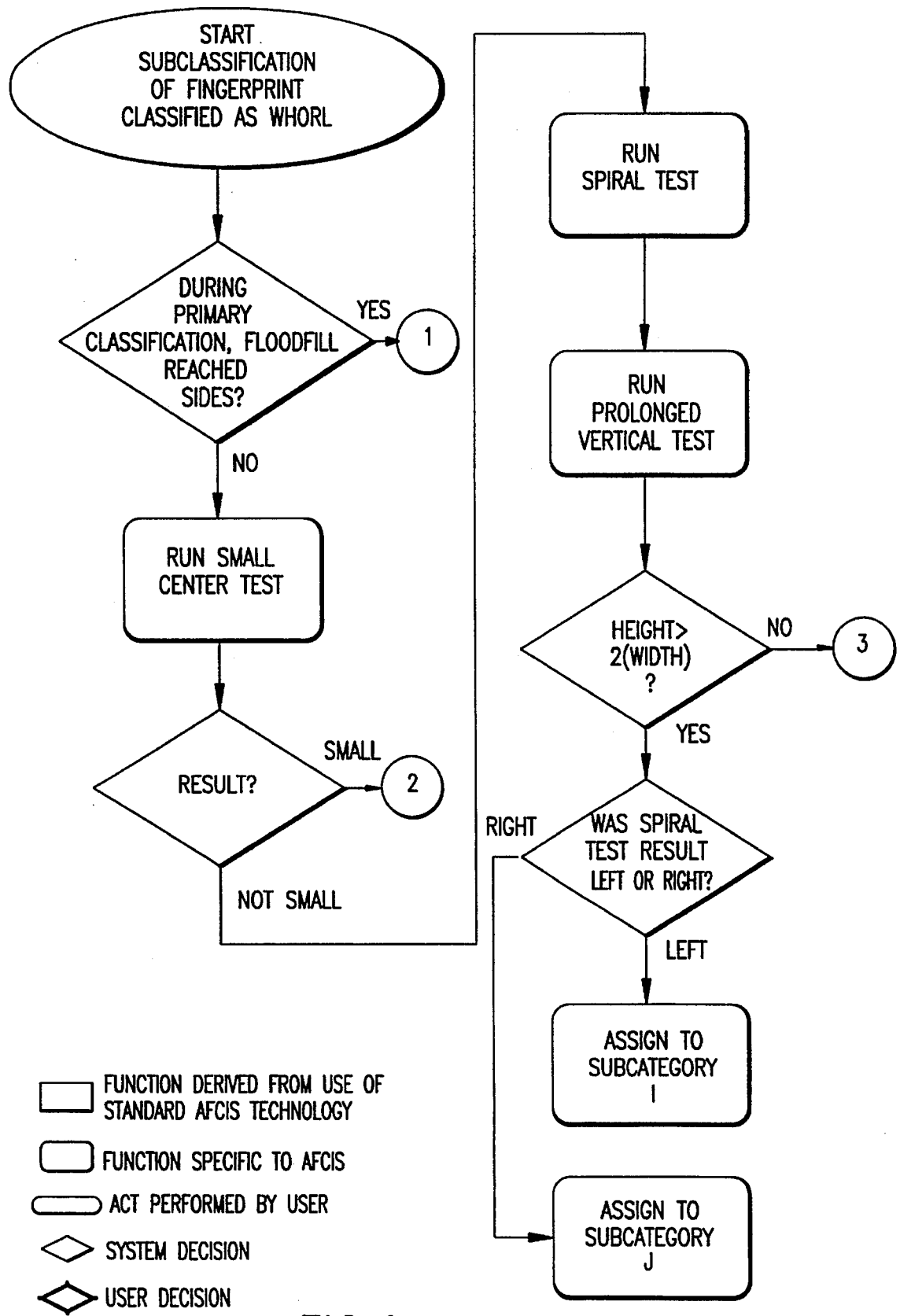
FIGS. 9A–9E are flow diagrams illustrating how the Subclassification of Whorls is accomplished according to a preferred embodiment of the present invention.
Figure 9B:
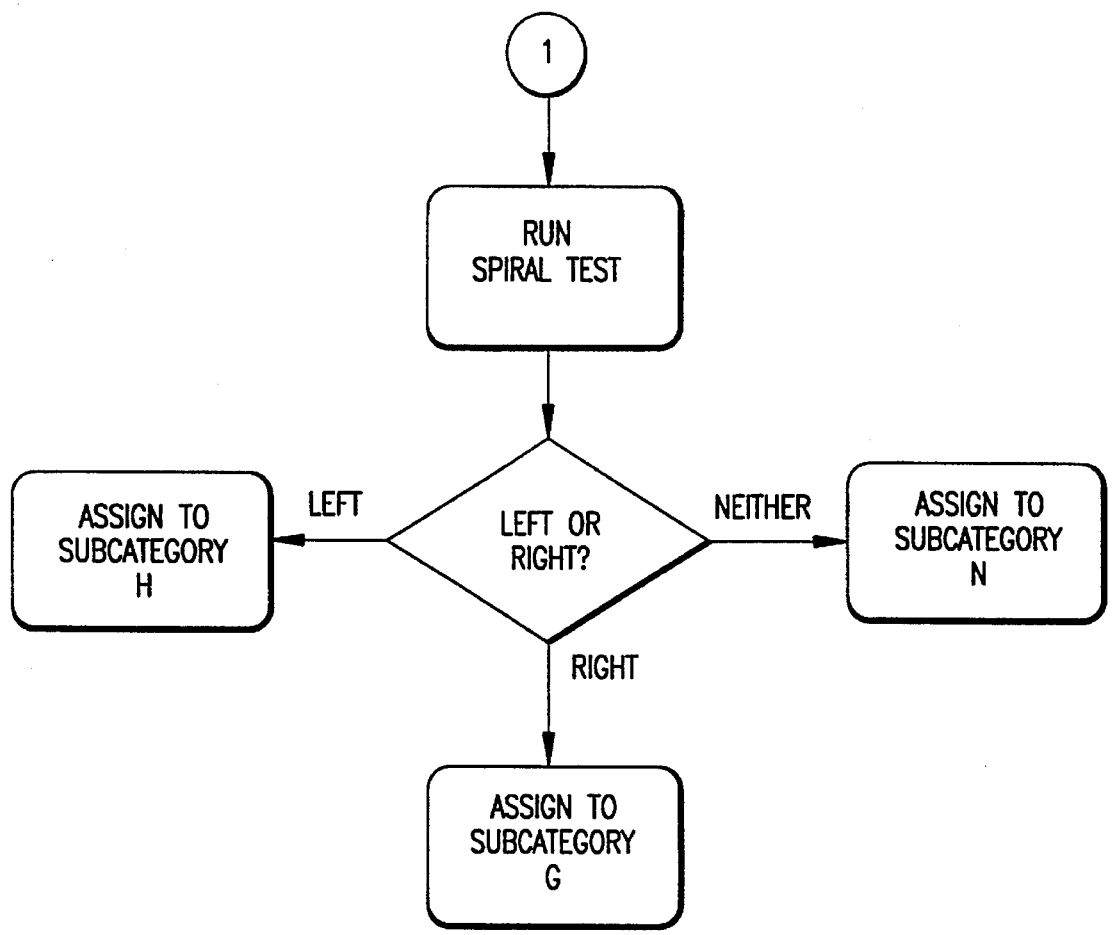
Figure 9C:
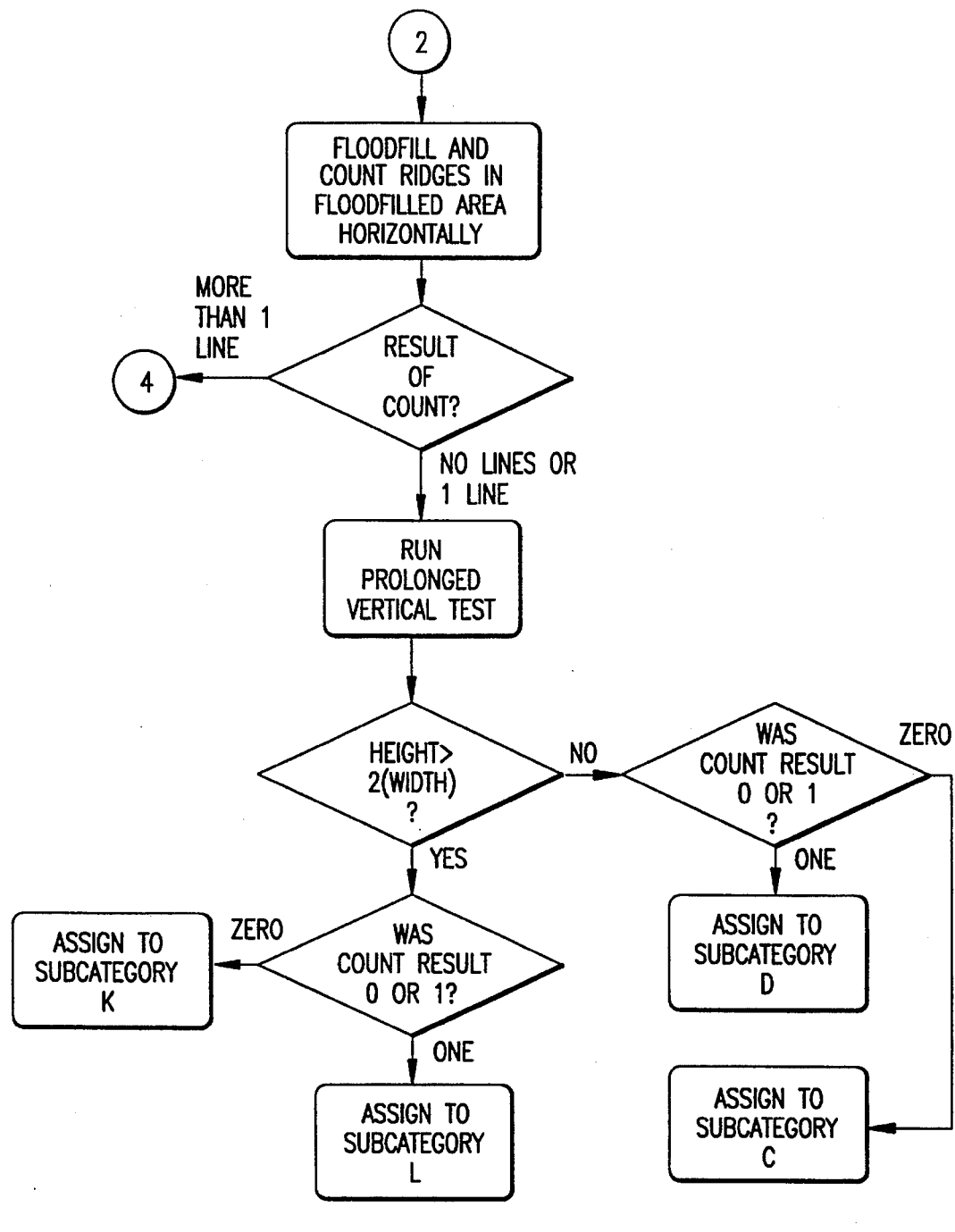
Figure 9D:
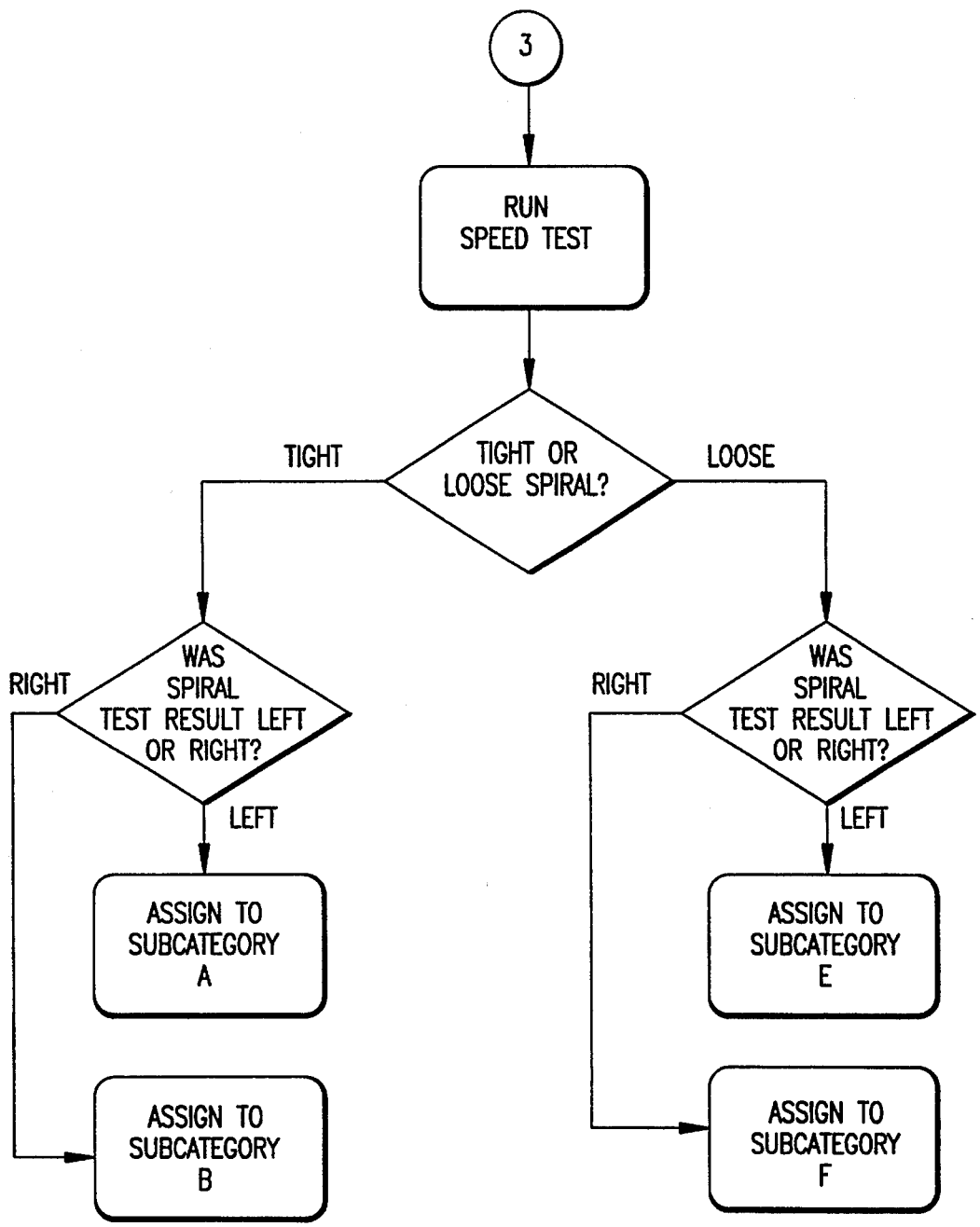
Figure 9E:
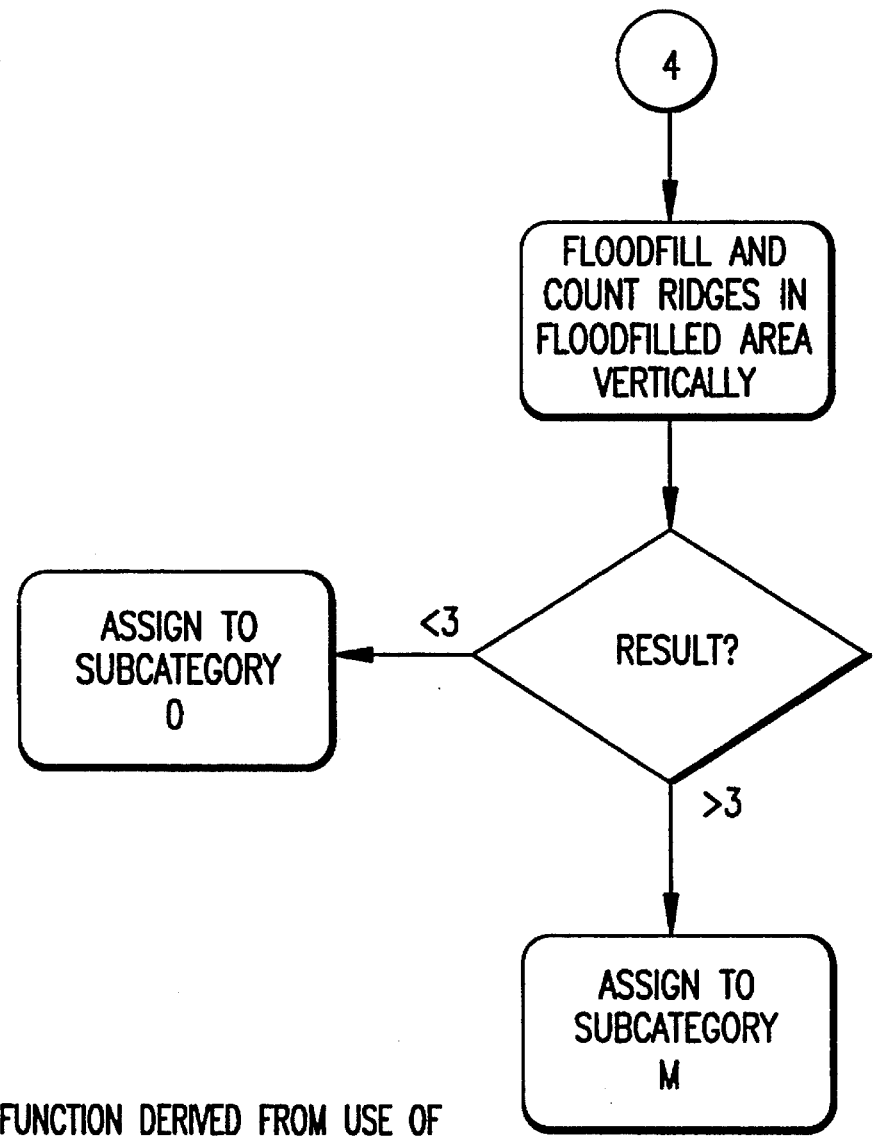

As points 718 and 720 on FIG. 7A show, the next step is to determine if the "colored" area touches any of the borders. If the colored area does not come in contact with any border, the print is a whorl. (See 710A and B on FIGS. 7A and 7B.) To illustrate, FIG. 8F shows, at point 812, a fingerprint of the whorl category before the valleys adjacent to the central feature have been colored and, at point 812, the same print after it has been colored. As the reader will note, the darkened area is oval in shape and does not come in contact with the border box surrounding the fingerprint.

Figure 4A:
FIGS. 4A through 4D depict examples of Whorl Subcategories according to a preferred embodiment of the present invention.
Figure 4B:
Figure 4C:
Figure 4D:
Figure 4E:
Figure 4F:
Figure 4G:
Figure 4H:
Figure 4I:
Figure 4J:
Figure 4K:
Figure 4L:
Figure 4M:
Figure 4N:
Figure 4O:

If the colored area in a fingerprint does come in contact with the border box, the software must perform additional steps in order to determine if it is a Whorl pertaining to the subcategories G, H or N (see samples of these subcategories FIGS. 4G, 4H or 4N); if it is an Internal or External Loop; or if it is or an Arch. First, the software examines the up-down symmetry, that which is above or below the horizontal line through the central feature, to see how much of the total area of the colored area is in the upper half of the box and how much is in the lower half of the box. If the areas above and below the line are equal or, more simply, if 50 percent or more of the filled area is above the central feature horizon line, then the fingerprint is a Whorl pertaining to subcategory G, H, or N. (See 722 on FIG. 7B.)

If the print is not a Whorl, the software checks to see if the filled in area reaches one or both sides of the border box (see 724). It does this by tallying the number of colored or shaded pixels on a vertical line ½ the distance inside each bounding edge to the central point on left and right. Both sides are considered to be reached if they are nearly equal, meaning the fingerprint is an Arch (see 702). If only a single side is touched, the fingerprint is a Loop (see 704). The software then determines it is an Internal or an External Loop. This determination is based on an area tally of black pixels on the left and right side. If the tally is weighted to the left, the fingerprint is classified as an Internal Loop. If it is weighted to the right, it is an External Loop. The process can be understood more easily by referring to 806 on FIG. 8C which shows the bitmap of an External Loop fingerprint before the floodfill process has been performed and, at 808 after floodfilling. As the reader will note, the darkened floodfilled area actually touches both sides of the box, but the amount of colored area on the right side of the border box is far greater than the amount colored area of the left side of the box, thus conforming to the definition of an External Loop. Similarly, 802 and 804 show an Arch fingerprint before floodfilling and after. The equal amount of filled area on each side of the box is apparent in 804.

If the system were to be incapable of determining the classification of a print after going through the decision process described above, the print would be classified as "unclassifiable" or, in the event of a missing finger, as an amputee.

b. Determining Secondary Classifications

Once the primary classification process is complete, the classification software can be configured so that it automatically proceeds to a subclassification step in which some or all of the fingerprints on the 10-fingerprint card are subclassified so as to achieve a greater degree of segmentation of the database. (The subclassification step is optional, since the use of the primary classifications alone provides an adequate level of segmentation for small databases.) In a preferred embodiment, the subcategories used are those described by Rosset and Lago and all of the fingers of the right hand are subcategorized.

The advantage of a decision tree based on the Vucetich primary categories and the subcategories described by Rosset and Lago is that it is simpler than the decision tree that would be required to automate the Henry Classification Method (which has multiple levels of subdivisions), yet it achieves a higher degree of file segmentation. Similarly, the level of file segmentation that it achieves is greater than that which can be achieved using a classification system with no subcategories.

(1) Subcategories of Whorl Category

As FIG. 7A and 7B show (at 710 and 726) the software classifies a fingerprint as a Whorl if (1) the darkened area produced by "coloring in" the three valleys close to the central feature does not touch the border box drawn around the fingerprint, or (2) if most of the "colored in" area lies in the upper half of the box. In the first case, the fingerprint is a Whorl corresponding to one of the following subcategories: A, B, C, D, E, F, I, J, K or L. (See examples of each in FIGS. 4A, 4B, 4C, 4D, 4E, 4F, 4I, 4J, 4K and 4L.) In the second case, the fingerprint is a Whorl corresponding to one of the following subcategories: G, H, or N. (See examples of each in FIGS. 4G, 4H and 4N.)

(a) Classification of Whorl Print When Floodfilled Area Does Not Touch Border

When the fingerprint is classified as a Whorl because the floodfilled or "colored in" area does not touch the border box, the software moves through the decision process depicted by points 728 through 744 of FIGS. 7A and 7B. The specific steps involved in the process are as follows:

In point 728, the software first categorizes the center as small or not small by counting the pixels made black when valleys adjacent to the central feature were filled in and dividing that number by the total number of pixels within the box surrounding the fingerprint. The center is defined as "small" if the number of pixels darkened during the floodfill process constitutes less than 25 percent of the pixels in the fingerprint box. If the center is not "small", the fingerprint corresponds to one of the spiral subcategories (A,B, E,F, I, J) shown in FIGS. 4A, 4B, 4E, 4F, 4I and 4J and the software moves to the decision at 730. If the center is small, the fingerprint corresponds to one of the whorl subcategories other than spiral or sinuous (i.e., subcategories C, D, K, L, M or 0; see FIG. 4C, 4D, 4K, 4L, 4M and 40). The software goes to the decision point corresponding to 740 on FIG. 7A to further process these fingerprints.

In point 730, to subclassify a spiral-type fingerprint, the software divides the fingerprint box into four quadrants by drawing a line through the central point and repeats the "floodfilling process", keeping track of the order in which the floodfill pattern crosses into the quadrants. If the resulting pattern begins in quadrant I (upper right-hand quadrant), then moves counterclockwise into quadrant II, (upper left-hand), then into quadrant III (lower-left hand quadrant), and finally into quadrant IV (lower right-hand quadrant), the spiral is a left-leaning spiral and the software moves to decision point 732 on FIG. 7A to complete the classification process. If, on the other hand, the flood-fill pattern moves clockwise from quadrant IV to quadrant I, the fingerprint is a right-leaning spiral and the software moves to decision point 736 on FIG. 7A.

In point 732, after determining that the fingerprint is a left-leaning spiral, the software tests for prolonged vertical case, meaning that the top-to-bottom distance of the filled area is greater than twice the left to right distance of the filled area. Where this is the case, the fingerprint is assigned to Subcategory I (see FIG. 4I). If this is not the system proceeds to step 734.

Figure 12A:
FIGS. 12A and 12B illustrate the use of floodfill to differentiate between "tight" and "loose" spiral patterns in fingerprints according to a preferred embodiment of the present invention.
Figure 12B:
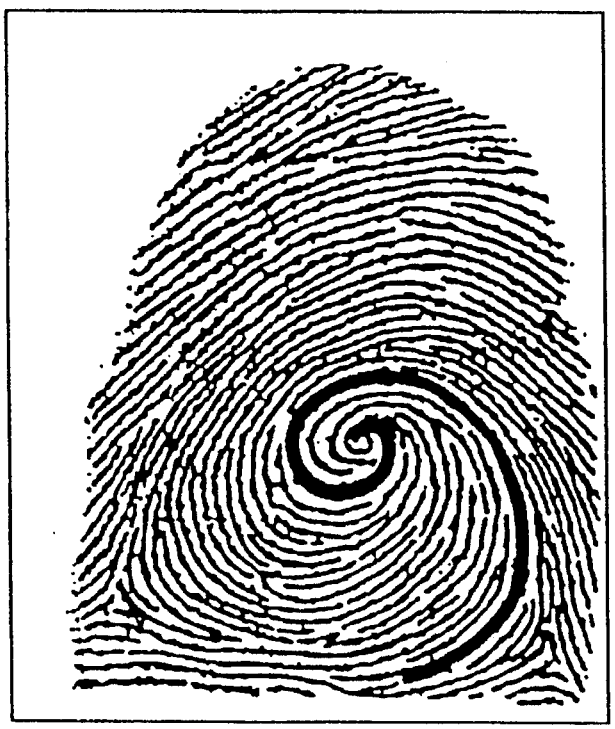

In point 734, the software takes the original bitmapped print and subtracts the area not covered by the floodfill, leaving only the core. The central feature is then floodfilled for a total of 25 pixels (alter the floodfill to stop at given count). It then measures the distance from the central feature, continues the floodfill for another 25 pixels, and again measures the distance. In this manner, it determines the "speed" of the spiral. In a tight spiral 1202 (see example in FIG. 12A), corresponding to Subcategory A (see FIG. 4A), the two distances should be quite close together. In a looser spiral 1204 (see example in FIG. 12B), corresponding to Subcategory E (see FIG. 4E), the two distances are widely separated.

In point 736, when, at decision point 730, the software determines that the spiral is a right-leaning one, the software applies the same test for prolonged vertical case that is applied at point 732. When the top-to-bottom distance of the filled area is greater than twice the left to right distance of the filled area, the fingerprint is assigned to Subcategory J. (See FIG. 4J.) If the top-to-bottom distance of the filled area is less than twice the left-to-right distance of the filled area, the software performs the spiral "speed test" described in the paragraph above (i.e., the same test as 734). If the spiral is a tight spiral, it is assigned to Subcategory B; if loose, it is assigned to Subcategory F. (See examples of these subcategories in FIGS. 4B and 4F.)

In point 740, when, at point 728, the software determines that the center is small (i.e., the pixels darkened during the floodfill process constitute less than 25 percent of the pixels in the fingerprint box), the software takes the original bitmapped fingerprint and does a floodfill in the first valley above the central feature (in a light color so that ridges within the colored area can be detected) and counts the number of ridges within the floodfilled area. One counting method that can be used is to (1) move right until reaching a white pixel, then (2) move left, counting each change from a color pixel to a black pixel until the next white pixel is reached, then (3) subtracting one from the total number of ridges counted. If the result is a single line, the software proceeds to the decision at point 742. If the result is 0 lines, the software proceeds to the decision at point 744. If the result is more than 1 line, the software proceeds to the decision point at 746.

In point 742, the software performs the prolonged vertical test described previously (732). If the height of the filled area is more than 2 times the width, the fingerprint is assigned to Subcategory L. If not, it is assigned to Subcategory D. (See examples of these subcategories in FIGS. 4C–4D.)

In point 744, the software performs the prolonged vertical test described previously (732). If the height of the filled area is more than 2 times the width, the fingerprint is assigned to Subcategory K. If not, it is assigned to Subcategory C. (See examples of these subcategories at FIGS. 4K and 4C.)

In point 746, the count performed at point 740 is repeated, this time moving from top to bottom rather than from side to side. If the resulting count is less than 3, the fingerprint is assigned to Subcategory O; if it is greater than 3, it is assigned to subcategory M. (See examples of fingerprints in these categories in FIGS. 4D and 4M.)

(b) Classification of Whorl Print When Floodfilled Area Touches Border

When the fingerprint is classified as a Whorl because (1) the floodfilled or "colored in" area touches one or both border boxes 720 and (2) 50% or more of the floodfilled area lies above the central feature horizon line, the fingerprint is subjected to the spiral test described in the previous section (i.e., the test performed at point 730). If the pattern resulting from the floodfill process begins in quadrant I (upper right-hand quadrant) and moves counter clockwise to quadrant IV (lower right-hand quadrant), the spiral is a left-leaning spiral and is assigned to Subcategory H. (If the floodfill pattern moves clockwise from quadrant IV to quadrant I, the fingerprint is a right-leaning spiral and the software is assigned to Subcategory G. If the pattern is neither left- or right-leaning, the fingerprint is assigned to Subcategory N. (See FIGS. 4H, 4G and 4N for examples of all subcategories identified in this paragraph.)

(2) Subcategories of Internal and External Loop Categories

As FIG. 7B shows, the processes for assigning fingerprints to subcategories of the External Loop Category and the Internal Loop Category are the same since the subcategories are based on the number of lines between the delta (a feature known to those skilled in the art of fingerprint classification which is shown at 502 on FIG. 5B) and the central feature (the location of which is determined when fingerprints are assigned to primary classifications). After the primary classifications have been assigned, the software simply counts the ridges by following a line between the central feature and the delta and tallying the number of changes from white to black. Examples of subcategories of the External and Internal Loop categories can be seen in FIG. 5A–5I.

(3) Subcategories of the Arch Category

A fingerprint is classified as an Arch (during the primary classification step) if the area that is colored in after the floodfill step touches the border box on both sides of the fingerprint. In assigning an Arch fingerprint to one of the four Arch subcategories, the first step in the process is to determine if the filled in area is more heavily weighted towards one side of the fingerprint box than the other or if both sides are evenly balanced (See 752.) This is accomplished by dividing the box in half and tallying the pixels on the left and right side of the box (i.e., the same process used to determine if a Loop is an Internal or External Loop). If the number of pixels on the left exceeds the number on the right by 15 percent or more, the fingerprint is classified as a left-leaning arch (FIG. 6B); if the number of pixels on the right exceeds the number of pixels on the left by 15 percent or more, the fingerprint is classified as a right-leaning arch (FIG 6C). If the number of pixels are roughly equal (within 15 percent of each other), the software determines, by process of elimination, if the print is a pyramid arch or a perfect arch 754.

The pyramid arch (FIG. 6D) has a sharp angle at its center. To determine if this feature exists, the software finds the slopes of the line very close to the central feature and to its right and left. If the lines are less than or equal to 90 degrees apart, the fingerprint is a pyramid arch; if not, the fingerprint is a perfect arch (FIG. 6A).

c. Host Computer for Classification Software

The size of the AFCIS database and the number of searches performed daily will dictate the computer on which the classification software resides. Where the AFCIS database contains fewer than 100,000 records and where there are few system users, the computer terminal can be the same as the controller 104. For larger systems, the software can reside on the same microcomputer or workstation-class terminal that hosts the Encoding Subsystem 110. In a preferred embodiment, the Encoding Subsystem 110 and Classification Subsystem 112 reside on the same computer 104, which is used to:

1) Call up a set of fingerprints entered via the Fingerprint Input Subsystem;

2) Create the templates used to perform comparisons;

3) Classify the fingerprints;

4) Enter a command instructing the Controller Subsystem to initiate a fingerprint comparison (i.e., to compare a newly created template to templates in the appropriate segment of the system's database);

5) Receive and view the results of a comparison; and

6) Enter a command instructing the Controller Subsystem to add a new set of fingerprints to the file.

7. Image Storage Subsystem 114

The Image Storage Subsystem 114 of FIG. 1 includes the hardware and software components used: (1) to store the sets of templates extracted from an individual's set of bitmapped fingerprints by the Encoding Subsystem, and (2) to store the bitmapped 10-finger fingerprint files scanned into the system by the Fingerprint Input Subsystem. These components serve the same function in an AFCIS as in an AFIS, with the exception that in the AFCIS, the templates and bitmapped fingerprint files are stored by Vucetich classification and, if applicable, subclassification.

Components used for the Image Storage Subsystem are readily available off-the-shelf and are well known to those familiar with AFIS technology. In most AFIS's, and in the preferred embodiment of this invention, the sets of templates are stored in magnetic memory on a hard disc. Because each bitmapped 10-finger fingerprint file stored on the system is large, the bitmapped fingerprint files are often stored on optical medium, in which case an optical disc reader an essential element of the Image Storage Subsystem.

8. Searcher Subsystem 116

The Search Subsystem 116 of FIG. 1 includes hardware and software components which are used to carry out the comparison of an unknown template against the templates on file in the AFCIS's database. The subsystem performs in exactly the same manner as in an AFIS with the exception that the unknown template is compared only to templates extracted from 10-fingerprint files of the same classification and (if applicable) subclassification.

Components used for the Search Subsystem are readily available off-the-shelf and are well known to those familiar with AFIS technology. In most AFIS's, and in the preferred embodiment of this invention, the search system is a stand-alone computer (microcomputer or workstation-class) equipped with commercially available software from such vendors as NEC or Cogent Systems. When the Controller Subsystem receives a request for a comparison from a user, it sends the relevant segment of the database to the searcher and instructs the searcher to carry out the comparison. The searcher then compares the unknown template to all of the templates in the relevant database segment and assigns a matching score for each template. A list of the templates most closely matching the unknown template (i.e., the templates with the highest matching scores) is then transmitted by the Search Subsystem to the terminal where the search request was entered (e.g., to the Searcher's own display terminal or, where the AFCIS 100 is designed as a local area network, to the display on the computer housing the Controller Subsystem or the Template Creation Subsystem).

The AFCIS 100 may use multiple searchers as a means of increasing productivity. However, the key advantage of the AFCIS 100 in comparison to the AFIS is that the AFCIS 100 requires fewer searchers to perform the same number of searches as an AFIS. This is due to the fact that the unknown template is compared to a small segment of the template database rather than to the whole database, meaning that the comparison process can be completed more rapidly.

9. Component Interface Subsystem 118

The Component Interface Subsystem 118 makes it possible to move data between the various system components described above. Except in the case of small systems in which all software resides on the same host computer, the Interface Subsystem 118 takes the form of a local area network or a wide area network. Hardware and software components used to create local area and wide area networks are known to those familiar with AFIS technology and are commercially available components readily available.

B. Operation: How Searches are Performed Using an AFCIS and How New Fingerprint Files are Added to the System FIGS. 2A–2E (generally referred to as FIG. 2) are flow diagrams showing how searches are performed using an AFCIS and how new records are added to the system according to a preferred embodiment of the present invention. So that one can easily distinguish between those steps that are common to both an AFIS and an AFCIS 100 and those that are unique to the AFCIS 100, square-cornered boxes are used to show processes common to both types of systems and round-cornered boxes are used to show processes that are unique to the AFCIS 100.

1. How Searches are Performed

This section explains the search process depicted in FIG. 2.

In step 202, fingerprints are entered into the system via 100 the Fingerprint Input subsystem 108. As discussed in Section A above, the Fingerprint Input Subsystem 108 can take the form of a flatbed scanner or a live scan fingerprint device. When a flatbed scanner is used, the fingerprints are entered into the system by scanning a previously created 10-finger fingerprint card. When a live scan unit is used, the individual whose fingerprints are being entered rolls his/her fingerprints onto a glass pad on the system following the system operator's instructions. Using a process known to those familiar with AFIS technology and described in vendor literature, the device uses laser light to capture the prints, which are then entered into the system.

Whether a flatbed scanner or a live scan unit is used, the Fingerprint Input System 108 creates a bitmap of the fingerprints scanned into the system in step 204. This is a function of the scanning device's software, regardless of brand name of the scanning device. The bitmapped files are stored in a temporary storage location (determined by the Controller Subsystem 104) until they are called up by the system operator for the next step. Depending on the configuration of the AFCIS 100, this temporary location can take the form of space on the computer housing the Controller Subsystem 104 or the Encoding Subsystem 110 or space on a separate, stand-alone computer (not shown) used exclusively for the temporary storage of fingerprint files before they are called up for processing by the encoding and classification subsystems 112.

In step 206, the fingerprint system operator calls up the bitmapped file using the Encoding Subsystem 110 software. The software selects one fingerprint from each hand (usually the thumb or index finger, depending on the policies of the organization using the AFCIS 100).

In step 208, the software applies algorithms to create a template of each of the two fingerprints selected. (The algorithms applied vary depending on the vendor who provides the software for minutiae extraction. Vendors include, but are not limited to, NEC and Cogent Systems.)

In step 210, after each template is created, it is displayed for review by the system operator. The minutiae points located by the system are marked with a small colored dot. Typically, the encoding subsystem software 110 also displays a message to inform the operator of the number of minutiae points located.

In a decisional step 212, if the number of minutiae points located by the system is below a certain threshold (which is set according to the policies of the organization where the AFCIS 100 is installed), according to step 213, the user is advised that the template is not acceptable, and requires manual editing, meaning that the operator examines the template and uses a mouse to mark minutiae points that the system did not detect. If the operator is able to locate enough minutiae points so that the template meets the acceptance criteria, the template can be saved and used for comparison.

In step 214, the template is saved in a temporary file of the Fingerprint Input Subsystem 108. It is not added to the permanent database of templates until after the full set of fingerprints is classified and the operator has verified that the template does not match any template already stored in the permanent database.

In step 216, after the templates have been created, a system operator initiates the classification process. Depending on the configuration of the AFCIS system 100, this can take place at the same terminal where the templates were created or at a separate terminal used exclusively for classification.

When the command to initiate classification is entered, the Classification Subsystem software copies the first fingerprint from the file of 10 fingerprints being classified and locates the central feature of the fingerprint. The software used to locate the central feature of the fingerprint is the same as that used for minutiae extraction and is available from a number of AFIS product vendors (including NEC and Cogent Systems).

In step 218, a boundary box is drawn around the fingerprint by drawing a line through the central feature's coordinate at a 30 degree angle to vertical until it runs out of print. This becomes two corners. The procedure is then repeated to create the other two corners. The four corner coordinates are then connected with black lines.

In step 220, the floodfill process described previously is applied. That is, the software locates the first valley above the central feature and colors it in, then repeats the process with the next two adjacent valley. The result is a bitmap in which the three valleys are flood filled.

In a decisional step 222, the software determines if the "colored" area touches any of the borders. If the colored area does not come in contact with any border, the print is a Whorl as shown in step 223 (See the example in FIG. 3D) pertaining to one of the non-spiral subcategories. (See FIG. 7A at #718 and the classification software description in Subsection A.6.a above.)

In decisional step 224, if fingerprint was not classified as a Whorl on the basis of the decision in the above step, the software runs an additional test to determine if it is a Whorl pertaining to the spiral categories. In this test, the software determines how much of the floodfilled (i.e., colored) area lies in the upper half of the box and how much lies in the lower half of the box. If 50 percent or more of the filled area lies above the central feature horizon line, then the fingerprint is classified as a Whorl as shown in step 225. (See example of Whorl fingerprint in FIG. 3. See also FIG. 7 at 720 and the classification software description in Subsection A.6.a above.)

In decisional step 226, if the print is not a Whorl, the software checks to see if the filled in area reaches one or both sides of the border box. It does this by tallying the number of black pixels on a vertical line 1/2 the distance inside each bounding edge to the central point on left and right. Both sides are considered to be reached if they are nearly equal. When this is the case, the fingerprint is classified as an Arch as shown in step 227. (See example of an Arch fingerprint in FIG. 3A. See also FIG. 7B at 724 and the classification software description in Subsection A.6.a above.)

In decisional step 228, if the fingerprint is not an arch (i.e., if the colored in area touches only one side of the border box) then it is a Loop. The software then determines if it is an Internal or an External Loop. This determination is based on an area tally of black pixels on the left and right side. If the tally is weighted to the left, the fingerprint is classified as an Internal Loop as shown in step 229. (See example of Internal Loop in FIG. 3B. See also FIG. 7B and the classification software description in Subsection A.6.a above.)

In a decisional step 230, if the fingerprint is weighted to the right, it is an External Loop. (See example of External Loop in FIG. 3. See also FIG. 7 at 748 and the classification software description in Subsection A.6.a above.)

In step 232, if the system were to be incapable of determining the classification of a fingerprint after going through the decision process described above, the print would be classified as "unclassifiable" or, in the event of a missing finger, as an amputee.

In step 234, once the first fingerprint has been classified, the AFCIS copies the next print in from the file of 10 fingerprints and repeats steps 202 through 232. It repeats the process until all ten fingerprints have been classified.

In step 236, after all ten fingerprints in a file have been classified, the system assigns the primary Vucetich classification to the file. The designator used is the same as that used in manual fingerprint files that use the Vucetich Classification System; in other words, as discussed previously in Subsection A.1.a above, it is a fraction consisting of the designators for the right thumb and fingers over the left thumb and fingers.

In decisional step 238, the system 100 determines whether or not the fingerprints in a file are to be subclassified. Depending on the number of fingerprint files residing on a given organization's AFCIS and on the number of searches the organization performs each day, the organization may not find it necessary to subclassify the fingerprint files. In this case, software modules required for subclassification will not be installed on the system (or will be inactive), and the system will automatically proceed to step 246 in FIG. 2. If the organization does use subclassifications, software modules for subclassification will be installed and functioning on the system. Depending on whether the fingerprint being classified is a Whorl, an Internal or External Loop, or an Arch, the software calls the classification module for Whorls, Loops, or Arches, and proceeds to step 240, 242, or 244 of FIG. 2.

Whether the subclassification software routines are called depends on another factor as well. Depending on the level of file segmentation an organization wishes to achieve, subcategories may be applied to one finger only, to all the fingers on one hand, or to all fingers. Where file subclassifications are derived by subclassifying all of the fingers of the right hand, the largest segment of the template database should, based on the information contained in Rosset and Lago, contain approximately 0.0025 percent of the templates in the database. If it is not necessary to achieve this degree of file segmentation, the organization may wish to use only one finger to derive subcategories; in the unlikely event that greater file segmentation is required, all ten fingers can be subclassified.

In step 240, if the fingerprint to be subclassified is a Whorl, the system calls the subroutine for whorls. A flow diagram of the decision making process carried out by the whorl subroutine is provided in FIGS. 9A–9E. (A detailed textual description of the process was provided previously in Subsection A.6.b.1).

Figure 10:
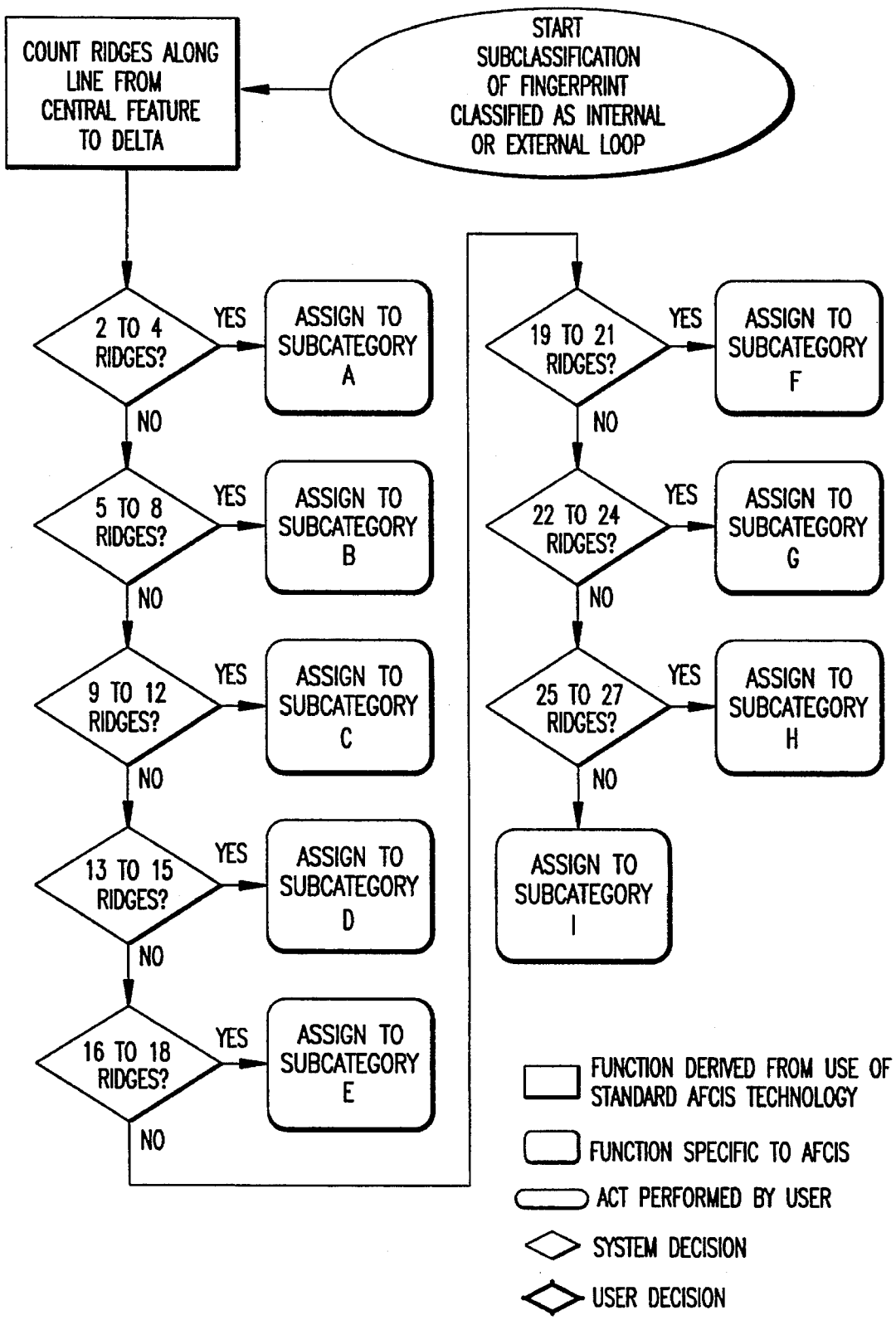
FIG. 10 is a flow diagram illustrating how the subclassification of loops (Internal and External) is accomplished according to a preferred embodiment of the present invention.

In step 242, if the fingerprint to be subclassified is either an Internal or External Loop, the system calls the subroutine for loops. A flow diagram of the decision making process carried out by the loop subroutine is provided in FIG. 10. [A detailed textual description of the process was provided previously in Subsection A.6.b(2)].

Figure 11:
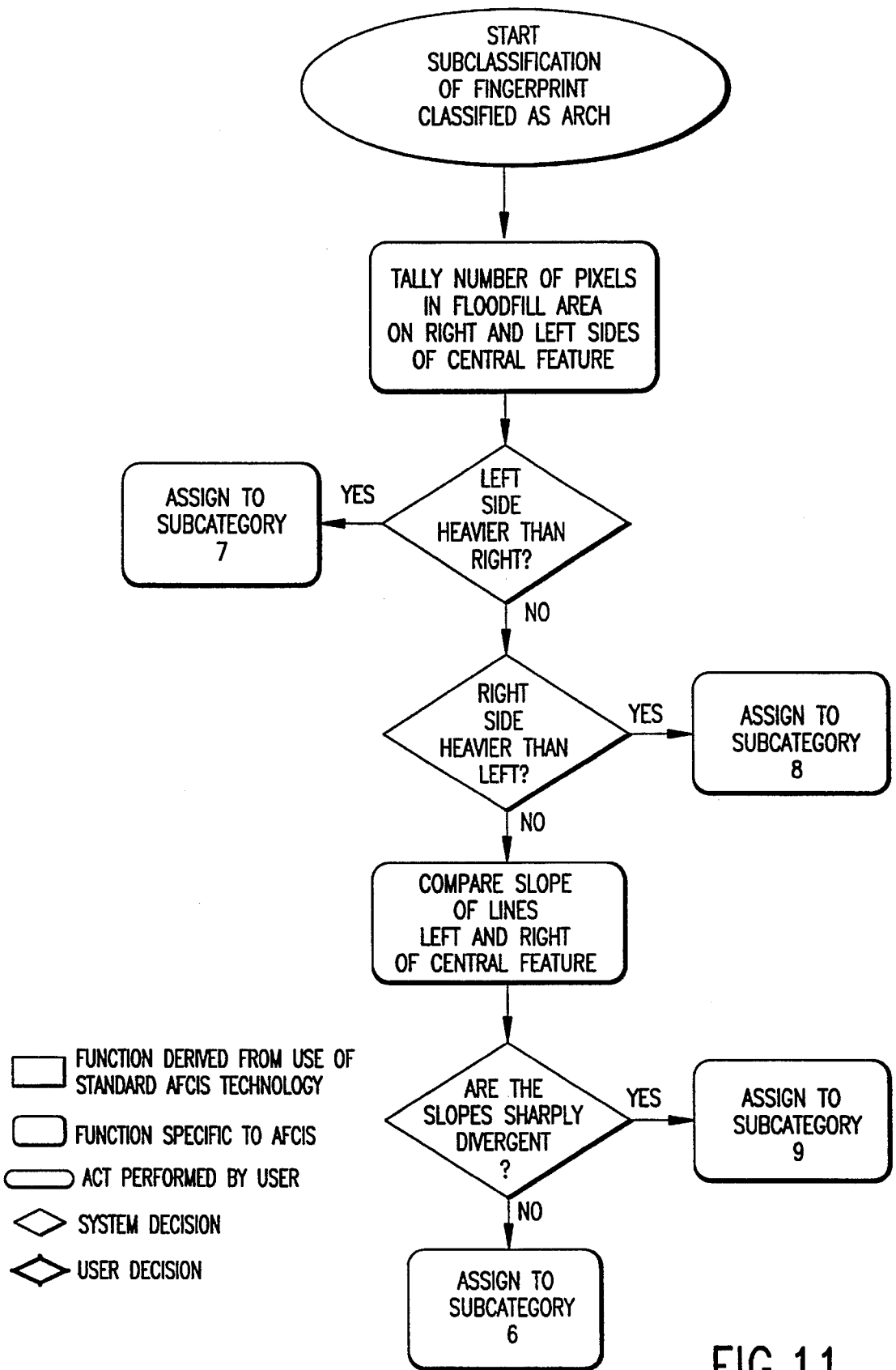
FIG. 11 is a flow chart illustrating how the subclassification of arches is accomplished according to the preferred embodiment of the present invention.

In step 244, if the fingerprint to be subclassified is an Arch, the system calls the subroutine for arches. A flow diagram of the decision making process carried out by the arch subroutine is provided in FIG. 11. [A detailed textual description of the process was provided previously in Subsection A.6.b(3)]. In step 246, once the classification (and, if applicable, subclassification) process is complete, the system proceeds with the comparison of one of the two "unknown templates" that were temporarily stored at step 214. It is at this step that the utility of the classification software of the invention makes itself apparent. Whereas the standard AFIS would, at this step, compare the unknown template to the entire database of stored templates and assign a matching score to each (i.e., a score based on the number of minutiae points in the unknown template that match the minutiae points in the file template), the AFCIS compares the unknown template only to templates extracted from fingerprint records that are of the same Vucetich classification and, if applicable, subclassification. By limiting the number of templates to which the unknown template must be compared to determine if there is a match, the amount of time required to perform a comparison is dramatically reduced, thereby increasing the number of searches that a single searcher can perform each day. To illustrate:

Using 483 searchers with a search speed of 1,000 comparisons per second, it would take an AFIS 4.1 seconds to compare an unknown template to templates from 2 million fingerprint records, meaning that an AFIS equipped in this manner would be capable of performing roughly 900 searches per hour.

Where the level of database segmentation achieved by an AFCIS is 0.0025% (which is consistent with the segmentation achieved by applying Vucetich classifications and subclassifications in manual files), the amount of time required for a single searcher to perform the database search is 0.05 seconds, meaning that an AFCIS equipped with a single searcher could perform roughly 8 times as many searches per hour as an AFIS equipped with 483 searchers.

In step 248, when the search process is complete, the AFCIS displays a short list of the templates that most closely matched the unknown template (i.e., the templates with the highest matching scores). The list is typically limited to 5 to 10 records which are identified by name or identity number. In most systems, the system will also automatically display the file template with the highest matching score next to the unknown template. The software required to effect this step is commercially available from AFIS software vendors.

In decisional steps 250 and 251, the system operator visually compares the unknown template to the template corresponding to the highest matching score and decides, based on standard policies in place at the institution where the AFCIS is installed, whether or not it is necessary to perform to compare the second template that was temporarily stored at step 214. (Typically, this decision depends on how high the matching score is and the reason the fingerprint search is being performed. If the matching score meets the user organization's criteria for positive identification, and if the comparison is being performed for non-criminal purposes, it is unlikely that the second template will be compared; if the matching score is close to, but does not exceed the organization's criteria for positive identity and the search is being performed to establish the identity of a criminal, the second template will undoubtedly be compared.)

In step 252, if it is necessary to compare the second template from the template set, the user enters a command to compare the second print.

In step 254, the same comparison step performed at steps 246 is repeated.

In step 256, the display step at 248 is repeated.

In step 258, the system operator reviews the results and determines if there is a match, then either notifies the requesting party that there was a match 260 or that there was no match 262. In the event that there is no match, meaning that there is no fingerprint file for this person on the system, the operator determines if the record is to be added to the system. If so, the steps described in the next subsection are taken.

2. How Records are Added Using an AFCIS 100

The process for adding a record using the AFCIS 100 involves the same steps described in the section above. Once the system operator has confirmed, at Step 258 of FIG. 2, that the record does not already exist on the system, he or she enters the command to add the record (FIG. 2, Step 264). The templates are then stored according to the Vucetich classification/subclassification of the fingerprint record from which they were extracted. (Step 266). The fingerprints themselves are also stored by Vucetich classification. (Step 268.)

One skilled in that art will appreciate that the present invention can be practiced by other than the embodiments described, which are present for purposes of illustration and not of limitation, and the present invention is limited only by the claims that follow.

What is claimed is:

1. An automated fingerprint classification and identification apparatus used to determine or verify the identity of an unknown person by comparing one or more of the person's unknown fingerprints to known fingerprints stored in a data base, the apparatus comprising:

a fingerprint input subsystem, operable to create a digitized bit-map of the unknown fingerprint and to store said bit-map in a memory of said fingerprint subsystem;

a template creation subsystem, coupled to said fingerprint input subsystem, operable to receive said bit-map of said unknown fingerprint and to create a digitized template based on locations of minutiae points in said bit-map;

a classification subsystem, coupled to said fingerprint input subsystem and said template creation subsystem, operable to receive said bit-map and said template and to assign said unknown fingerprint to a primary Vucetich category based on visually distinct patterns present in said bit-map and digital information extracted from said template, said classification subsystem includes, (a) means for determining a central feature of said unknown fingerprint, wherein said central feature is the innermost point of said unknown fingerprint;

(b) means for creating a bounding rectangle around said central feature;

(c) means for determining whether said central feature is within a first valley, and if not, then moving said central feature upward until it is within said first valley;

(d) means for generating a colored area by applying a floodfill algorithm to said unknown fingerprint in order to fill in said first valley and at least one valley adjacent to said first valley;

(e) means for classifying said unknown fingerprint as a whorl if said colored area does not touch the border of said bounding rectangle or if said colored area touches the border of said bounding rectangle and at least half of said colored area is above said central feature;

(f) means for classifying said unknown fingerprint as an arch if said colored area touches both sides of said bounding rectangle and approximately half of said colored area is right of said central feature and half of said colored area is left of said central feature; and (g) means for classifying said unknown fingerprint as a loop if said colored area touches only one side of said bounding rectangle, wherein said loop in an inside loop if said colored area is weighted on said left side and said loop in an external loop if said colored area is weighted on said right side;

an image storage subsystem, coupled to said classification subsystem, said template creation subsystem, and said fingerprint input subsystem, operable to store said bit-map and said template in memory locations that correspond to the primary Vucetich category and also to store known bit-maps and templates of known bit-maps in memory locations that correspond to the primary Vucetich category; and a search subsystem, coupled to the image storage subsystem, operable to compare said template of said unknown fingerprint to templates of said known fingerprints that are of the same primary Vucetich category as said unknown fingerprint, and to produce a result indicating a probability that said unknown fingerprint is identical to one of said known fingerprints.

2. The apparatus of claim 1, further comprising a user interface subsystem, coupled to said search subsystem and to said image storage subsystem, operable to display said digital result to a human operator.

3. The apparatus of claim 1, wherein the image storage subsystem further comprises memory locations which correspond to subcategories of said primary Vucetich category.

4. The apparatus of claim 1, wherein said primary Vucetich category is one of a plurality of primary Vucetich categories including: an arch fingerprint category, an internal loop fingerprint category, an external loop fingerprint category, and a whorl fingerprint category.

5. The apparatus of claim 3, wherein said subcategories are visually distinct patterns present in said primary Vucetich category.

6. In an automated fingerprint classification and identification system for determining or verifying the identity of an unknown person by comparing one or more of the person's unknown fingerprints to known fingerprints stored in a database, a method comprising the steps of:

storing the known fingerprints in the data base, having a plurality of memory locations, each one of said memory locations correspond to a primary category of a fingerprint classification system, wherein said fingerprint classification system is a Vucetich fingerprint classification system;

receiving one of the unknown fingerprints;

automatically determining to which primary category of the Vucetich fingerprint classification system the unknown fingerprint corresponds, wherein said Vucetich fingerprint classification system has four primary categories, wherein said automatically determining step includes the steps of, (a) determining a central feature of said unknown fingerprint, wherein said central feature is the innermost point of said unknown fingerprint;

(b) creating a bounding rectangle around said central feature;

(c) determining whether said central feature is within a first valley, and if not, then moving said central feature upward until it is within said first valley;

(d) generating a colored area by applying a floodfill algorithm to said unknown fingerprint in order to fill in said first valley and at least one valley adjacent to said first valley;

(e) classifying said unknown fingerprint as a whorl if said colored area does not touch the border of said bounding rectangle or if said colored area touches the border of said bounding rectangle and at least half of said colored area is above said central feature;

(f) classifying said unknown fingerprint as an arch if said colored area touches both sides of said bounding rectangle and approximately half of said colored area is right of said central feature and half of said colored area is left of said central feature; and (g) classifying said unknown fingerprint as a loop if said colored area touches only one side of said bounding rectangle, Wherein said loop in an inside loop if said colored area is weighted on said left side and said loop in an external loop if said colored area is weighted on said right side;

comparing said unknown fingerprint to said known fingerprints of said data base that are of the same Vucetich classification primary category as the unknown fingerprint indicated by said automatically determining step; and determining whether a match exists between said unknown fingerprint and one of the known fingerprints of the same Vucetich classification primary category.

7. The method of claim 6, wherein the data base further comprises memory locations which correspond to subcategories of at least one of said primary categories of the Vucetich fingerprint classification.

8. The method of claim 6, wherein said primary categories of said Vucetich fingerprint classification system include an arch fingerprint category, an internal loop fingerprint category, an external loop fingerprint category, and a whorl fingerprint category.

9. The apparatus of claim 7, wherein said subcategories are visually distinct patterns present in said primary Vucetich fingerprint classification system.

10. The system of claim 1, wherein said digitized template contains a plurality of minutiae points, wherein if said digitize template does not contain a certain threshold number of said minutiae points, a user is allowed to edit said template to add additional minutiae points to said digitized template.

11. The system of claim 1, further comprising means for automatically determining which subcategory of the Vucetich fingerprint classification system the unknown fingerprint corresponds.

12. The method of claim 6, further comprising the step of automatically determining which subcategory of the Vucetich fingerprint classification system the unknown fingerprint corresponds.

13. The system of claim 1, wherein said generating means applies said floodfill algorithm to said unknown fingerprint to said first valley and at least two valleys adjacent to said first valley.

14. The method of claim 6, wherein said step of generating a colored area applies said floodfill algorithm to said unknown fingerprint to said first valley and at least two valleys adjacent to said first valley.

* * * * *